(12) United States Patent
Li et al.

(10) Patent No.: US 11,092,858 B2
(45) Date of Patent: Aug. 17, 2021

(54) PIXEL STRUCTURE AND PIXEL UNIT

(71) Applicant: Xianyang Caihong Optoelectronics Technology Co., Ltd, Xianyang (CN)

(72) Inventors: Zhuo Li, Xianyang (CN); Yuan-Liang Wu, Xianyang (CN); Haiyan Kang, Xianyang (CN)

(73) Assignee: XIANYANG CAIHONG OPTOELECTRONICS TECHNOLOGY CO., LTD, Xianyang (CN)

( * ) Notice: Subject to any disclaimer, the term of this patent is extended or adjusted under 35 U.S.C. 154(b) by 0 days.

(21) Appl. No.: 16/556,356

(22) Filed: Aug. 30, 2019

(65) Prior Publication Data
US 2020/0096826 A1    Mar. 26, 2020

(30) Foreign Application Priority Data

Sep. 26, 2018  (CN) .......................... 2018111244686
Sep. 26, 2018  (CN) .......................... 2018111256429
Sep. 26, 2018  (CN) .......................... 2018111256433
Sep. 26, 2018  (CN) .......................... 2018111256448

(51) Int. Cl.
*G02F 1/1343*    (2006.01)
*G02F 1/137*    (2006.01)
(Continued)

(52) U.S. Cl.
CPC ........ *G02F 1/134309* (2013.01); *G02F 1/137* (2013.01); *G02F 1/134336* (2013.01); *G09G 3/3607* (2013.01); *G02F 1/1368* (2013.01); *G02F 1/13439* (2013.01); *G02F 1/13775* (2021.01); *G02F 1/134345* (2021.01);
(Continued)

(58) Field of Classification Search
CPC ............... G02F 1/134309; G02F 1/137; G02F 1/134336; G02F 1/1368; G02F 1/13439; G02F 1/133707; G02F 2001/134345; G02F 2201/13775; G02F 2201/123; G02F 2201/122; G02F 2203/30; G09G 3/3607; G09G 2300/0478; G09G 2300/0439; G09G 2300/0426; G09G 2300/0447; G09G 2320/0233; G09G 2320/0209;
(Continued)

(56) References Cited

U.S. PATENT DOCUMENTS

2009/0237345 A1*  9/2009  Kamada ............... G09G 3/3648
                                                                    345/94
2012/0075562 A1*  3/2012  Yeh .................... G02F 1/134363
                                                                    349/139

(Continued)

*Primary Examiner* — David Tung
(74) *Attorney, Agent, or Firm* — WPAT, PC

(57) ABSTRACT

The invention discloses a pixel structure and a pixel unit. The pixel structure includes a main electrode; and a plurality of branch electrodes connected to the main electrode; wherein the branch electrode includes a first branch electrode and a second branch electrode, an acute intersecting angle between the first branch electrode and the main electrode is a first angle, and an acute intersecting angle between the second branch electrode and the main electrode is a second angle. The invention solves the whitening phenomenon which occurs in the side view by designing the acute intersecting angle between the branch electrode and the main electrode as the first angle and the second angle.

11 Claims, 17 Drawing Sheets

(51) Int. Cl.
*G09G 3/36* (2006.01)
*G02F 1/1368* (2006.01)

(52) U.S. Cl.
CPC .. *G02F 2201/122* (2013.01); *G02F 2201/123* (2013.01); *G02F 2203/30* (2013.01); *G09G 2300/0426* (2013.01); *G09G 2300/0439* (2013.01); *G09G 2300/0478* (2013.01); *G09G 2320/0209* (2013.01); *G09G 2320/0233* (2013.01)

(58) Field of Classification Search
CPC ..... G09G 2320/068; G09G 2320/0673; G09G 2320/0242
See application file for complete search history.

(56) References Cited

U.S. PATENT DOCUMENTS

| | | | | |
|---|---|---|---|---|
| 2012/0105785 | A1* | 5/2012 | Kim | G02F 1/136209 349/139 |
| 2013/0093658 | A1* | 4/2013 | Park | G02F 1/136286 345/92 |
| 2013/0120469 | A1* | 5/2013 | Tien | G09G 3/3696 345/690 |
| 2014/0036192 | A1* | 2/2014 | Iyama | H01L 29/7869 349/46 |
| 2015/0070623 | A1* | 3/2015 | Kang | G02F 1/134336 349/61 |
| 2016/0291369 | A1* | 10/2016 | Park | G02F 1/136209 |
| 2016/0349583 | A1* | 12/2016 | Park | G02F 1/136286 |
| 2019/0139987 | A1* | 5/2019 | Gan | H01L 23/3171 |

* cited by examiner

PIXEL STRUCTURE AND PIXEL UNIT

FIELD OF THE DISCLOSURE

The invention relates to the field of display technologies, and in particular to a pixel structure, a pixel unit, and a display panel using the pixel unit.

BACKGROUND OF THE DISCLOSURE

As the display specifications of liquid crystal displays continue to develop toward large sizes, the market demands more and more attention to high contrast, rapid response, and wide viewing angles for the performance requirements of liquid crystal displays. In order to overcome the viewing angle problem of a large-sized liquid crystal display panel, the wide viewing angle technology of the liquid crystal display panel must be continuously improved and broken. Polymer Stabilized Vertically Aligned (PSVA) is one of the wide viewing angle technologies currently widely used in liquid crystal display panels.

At present, PSVA type liquid crystal panels generally adopt 4-Domain design. In order to maximize the transmittance of the PSVA type liquid crystal panel, the liquid crystal direction of each domain is at an angle of 45 degrees with the absorption axis of the polarizing plate. Therefore, it is necessary to set the angle between the direction of the ITO (Indium Tin Oxide) electrode and the horizontal direction to 45 degrees.

However, since the optical path difference of the liquid crystal is larger than the front view direction in the side view direction, whitening occurs in side view.

SUMMARY OF THE DISCLOSURE

In order to solve the above problems in the prior art, the invention provides a pixel structure and a pixel unit. The technical problem to be solved by the invention is achieved by the following technical solutions:

Specifically, a pixel structure provided by an embodiment of the invention includes: a main electrode; and a plurality of branch electrodes connected to the main electrode; wherein the plurality of branch electrodes includes first branch electrodes and second branch electrodes, an acute intersecting angle between the first branch electrode and the main electrode is a first angle, and an acute intersecting angle between the second branch electrode and the main electrode is a second angle.

In an embodiment of the invention, the first angle is equal to 45 degrees and the second angle is greater than or equal to 40 degrees and less than 45 degrees.

In an embodiment of the invention, the main electrode is a cross-shaped electrode, the main electrode divides the pixel structure into four domains, adjacent two branch electrodes in any one of the domains are parallel to each other, the branch electrodes in the adjacent two domains are not parallel to each other, any two of the four domains are disposed with the first branch electrodes, and the other two of the four domains are disposed with the second branch electrodes.

In an embodiment of the invention, the pixel structure includes a first sub pixel structure corresponding to a bright area, and a second sub pixel structure corresponding to a dark area; correspondingly, a number of the main electrode is multiple and the multiple main electrodes include a first main electrode and a second main electrode; wherein the first sub pixel structure includes the first main electrode and the first branch electrodes, each the first branch electrode is connected to the first main electrode, and an acute intersecting angle between the first branch electrode and the first main electrode is the first angle; the second sub pixel structure includes the second main electrode and the second branch electrodes, each the second branch electrode is connected to the second main electrode, and an acute intersecting angle between the second branch electrode and the second main electrode is the second angle.

In an embodiment of the invention, the first angle is greater than or equal to 40 degrees and less than 45 degrees, and the second angle is equal to 45 degrees.

In an embodiment of the invention, the first main electrode is a cross-shaped electrode, the first main electrode divides the first sub pixel structure into four first domains, and adjacent two first branch electrodes in any one of the four first domains are parallel to each other; adjacent two of the four first domains are symmetric relative to the first main electrode, and the first branch electrodes of adjacent two of the four first domains are not parallel to each other.

In an embodiment of the invention, the second main electrode is a cross-shaped electrode, the second main electrode divides the second sub pixel structure into four second domains, adjacent two second branch electrodes of any one of the four second domains are parallel to each other; adjacent two of the four second domains are symmetric relative to the second main electrode, and the second branch electrodes of adjacent two of the four second domains are not parallel to each other.

Furthermore, a pixel unit provided by an embodiment of the invention includes a plurality of pixel structures. The pixel structure includes a first pixel structure including a first main electrode and first branch electrodes connected to the first main electrode, wherein an acute intersecting angle between the first branch electrode and the first main electrode is a first angle; and a second pixel structure including a second main electrode and second branch electrodes connected to the second main electrode, wherein an acute intersecting angle between the second branch electrode and the second main electrode is a second angle.

In an embodiment of the invention, the first angle is greater than or equal to 40 degrees and less than 45 degrees, and the second angle is equal to 45 degrees.

In an embodiment of the invention, the first main electrode is a cross-shaped electrode, the cross-shaped electrode divides the first pixel structure into four first domains, adjacent two of the first branch electrodes in any one of the four first domains are parallel to each other, and the first branch electrodes of adjacent two of the four first domains are not parallel to each other.

In an embodiment of the invention, the second main electrode is a cross-shaped electrode, the cross-shaped electrode divides the second pixel structure into four second domains, adjacent two of the second branch electrodes in any one of the four second domains are parallel to each other, and the second branch electrodes of adjacent two of the four second domains are not parallel to each other.

In an embodiment of the invention, the pixel unit further includes a data line, a scan line, switching devices, electrically connected to the data line and the scan line, and further electrically connected to the first pixel structure and the second pixel structure respectively.

In an embodiment of the invention, the first pixel structure and the second pixel structure are alternately arranged along a lengthwise direction of the data line according to a first interval setting; the first pixel structure and the second pixel structure are alternately arranged along a lengthwise direction of the scan line according to a second interval setting.

In an embodiment of the invention, a polarity of the pixel structure in an i-th column is opposite to a polarity of the pixel structure in an (i+1)-th column, and a voltage is applied to the pixel structures in a first driving method or a second driving method.

In an embodiment of the invention, the first driving method includes a first sub driving method and a second sub driving method; and in a frame, the voltage is loaded onto the pixel structure in the first sub driving method or the second sub driving method alternately in a first predetermined interval along the lengthwise direction of the scan line; the second driving method includes a third sub driving method and a fourth sub driving method; and in a frame, the voltage is loaded onto the pixel structure in the third sub driving method or the fourth sub driving method alternately in a second predetermined interval along the lengthwise direction of the scan line.

In addition, another pixel structure provided by the embodiment of the invention includes: a main electrode; and a plurality of branch electrodes connected to the main electrode; wherein each of the branch electrodes includes N sub-branch electrodes connected in sequence, and N is a positive integer greater than 1.

In an embodiment of the invention, an acute intersecting angle between the sub-branch electrode and the main electrode is greater than or equal to a first angle and less than or equal to a second angle.

In an embodiment of the invention, the first angle is equal to 40 degrees, and the second angle is equal to 45 degrees.

In an embodiment of the invention, the main electrode is a cross-shaped electrode, the cross-shaped electrode divides the pixel structure into four domains, adjacent two branch electrodes in any one of the four domains are parallel to each other; adjacent two of the four domains are symmetric with respect to the cross-shaped electrode, and the branch electrodes in adjacent two of the four domains are not parallel to each other.

In an embodiment of the invention, each of the branch electrodes has a set number of sub-branch electrodes having a same acute intersecting angle with respect to the main electrode, and the set number is less than N.

Compared with the prior art, the invention has one or more of the following beneficial effects:

(i) the embodiment of the invention solves the whitening phenomenon occurring in the side view by designing the acute intersecting angle between the branch electrode of the pixel electrode and the main electrode in the pixel electrode, for example, as the first angle and the second angle;

(ii) the pixel structure of the embodiment of the invention includes a first sub pixel structure and a second sub pixel structure, the acute intersecting angle between the first branch electrode and the first main electrode in the first sub pixel structure is a first angle, and the acute intersecting angle between the second branch electrode and the second main electrode in the second sub pixel structure is a second angle, thereby solving the whitening phenomenon occurring in the side view;

(iii) the pixel unit of the embodiment of the invention includes a first pixel structure and a second pixel structure, and the acute intersecting angle between the first branch electrode of the first pixel structure and the first main electrode is a first angle, and the acute intersecting angle between the second branch electrode of the second pixel structure and the second main electrode is a second angle, thereby solving the whitening phenomenon occurring in side view; and (iv) embodiments of the invention are designed by designing a pixel electrode such as a branch electrode in an ITO electrode to be composed of a plurality of sub-branch electrodes connected end to end, each branch electrode has the same number of sub-branch electrodes and the acute intersecting angle of the main electrode is the same, which solves the whitening phenomenon that occurs in side view.

BRIEF DESCRIPTION OF THE DRAWINGS

FIG. 6 is a schematic diagram of still another pixel unit according to an embodiment of the invention.

FIG. 7 is a schematic diagram of still another pixel unit according to an embodiment of the invention.

FIG. 20 is a schematic structural diagram of another pixel unit according to an embodiment of the invention.

DETAILED DESCRIPTION OF PREFERRED EMBODIMENTS

The invention will be further described in detail below with reference to specific embodiments, but the embodiments of the invention are not limited thereto.

It should be noted that the terms "vertical", "horizontal", "left", "right" and the like are used herein for the purpose of illustration only and are not intended to be the only embodiment.

Embodiment 1

Figure 1:
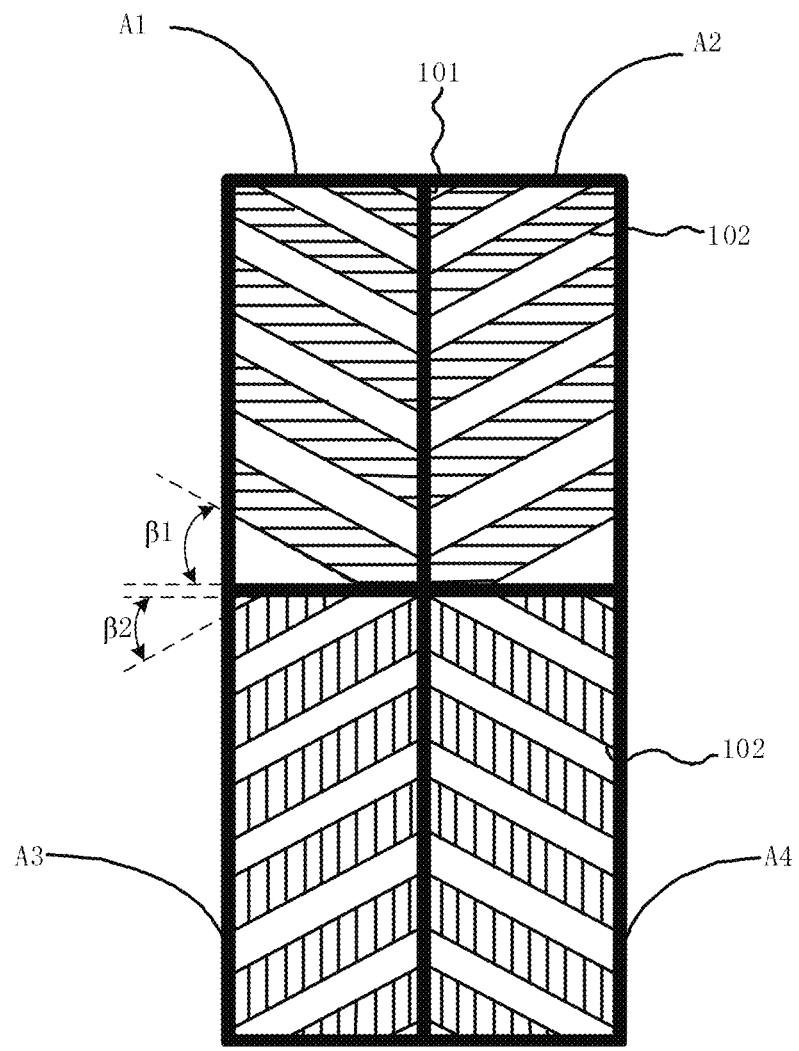
FIG. 1 is a schematic structural diagram of a pixel according to an embodiment of the invention.

Referring to FIG. 1, FIG. 1 is a schematic structural diagram of a pixel according to an embodiment of the invention. The pixel structure of this embodiment includes:
a main electrode 101; and
a plurality of branch electrodes 102 connected to the main electrode 101;
the branch electrode includes a first branch electrode and a second branch electrode, an acute intersecting angle between the first branch electrode and the main electrode is a first angle β1, and an acute intersecting angle between the second branch electrode and the main electrode is a second angle β2.

In a specific embodiment, the first angle β1 is equal to 45 degrees and the second angle β2 is greater than or equal to 40 degrees and less than 45 degrees.

Preferably, the second angle β2 is 42 degrees.

When the acute intersecting angle β1 between the first branch electrode and the main electrode of a pixel structure is 45 degrees, and the acute intersecting angle β2 between the second branch electrode and the main electrode is 42 degrees, the effect of removing the whitening phenomenon in side view is best.

The main electrode 101 in the embodiment is strip-shaped, and the main electrode 101 is a branch electrode 102 on both sides, and each branch electrode 102 is also strip-shaped, and is connected to the main electrode 101. A slit is formed between the gaps between each adjacent two branch electrodes 102 and extends to an edge position of the pixel structure, which is generally referred to as an alignment slit.

The embodiment of the invention solves the whitening phenomenon which occurs in the side view by designing the acute intersecting angle between the branch electrode of the pixel electrode, for example, the ITO electrode and the main electrode, as the first angle β1 and the second angle β2. Moreover, while ensuring the removal of the whitening phenomenon, it is also ensured that the pixel structure has a high transmittance, thereby making the display more uniform and improving the display effect.

In a specific embodiment, the main electrode is a cross-shaped electrode, the main electrode divides the pixel structure into four domains, and adjacent two branch electrodes in any one of the domains are parallel to each other, wherein:

A plurality of first branch electrodes are disposed in any two of the domains, and a plurality of second branch electrodes are disposed in the other two of the domains.

In a specific embodiment, the angle between the first branch electrode and the horizontal direction of the cross-shaped electrode is a first angle β1, and the angle between the second branch electrode and the horizontal direction of the cross-shaped electrode is a second angle β2.

In a specific embodiment, referring to FIG. 1, the main electrode is a cross-shaped electrode, and the cross-shaped electrode divides the pixel structure into four domains, namely, A1, A2, A3, and A4. The A1 domain is adjacent to the A2 domain and the A3 domain. In each of the above four domains, the branch electrodes in each domain are connected to the main electrode 101, so that the electrodes are interconnected. For one of the four domains, the inclination directions of all the branch electrodes in each domain are the same, that is, the adjacent two branch electrodes in any one of the domains are parallel to each other.

Taking the A1 domain as an example, the relative position of the A1 domain is located at the upper left of the pixel structure, and the tilt direction of the branch electrodes in the domain is also inclined toward the upper left direction.

Preferably, the branch electrodes in the adjacent two domains are not parallel to each other.

That is, taking the A2 domain as an example, the relative position of the A2 domain is located at the upper right of the pixel structure, and the tilt direction of the branch electrode in the domain is also inclined toward the upper right direction; taking the A3 domain as an example, the relative position of the A3 domain is located at the lower left of the pixel structure, and the tilt direction of the branch electrode in the domain is also inclined toward the lower left direction; taking the A4 domain as an example, the relative position of the A4 domain is located at the lower right of the pixel structure, and the tilt direction of the branch electrode in the domain is also inclined toward the lower right direction. That is to say, the orientation of any one of the branch electrodes in the A1 domain is different from that of any one of the A2 domain, that is, the branch electrodes in the A1 domain are not parallel to the branch electrodes in the A2 domain. Similarly, the branch electrodes in the A1 domain are not parallel to the branch electrodes in the A3 domain. The orientation of the above electrodes can be set to improve the display color shift after voltage application.

Further, the branch electrodes in the two domains adjacent in the first direction are all the first branch electrodes, the branch electrodes in the adjacent two domains in the second direction are all second branch electrodes.

Preferably, the first direction and the second direction are both horizontal directions.

For example, referring to FIG. 1, both the A1 domain and the A2 domain are in the first direction, and the branch electrodes in the A1 domain and the A2 domain are the first branch electrodes, both the A3 domain and the A4 domain are in the second direction, and the branch electrodes in the A3 domain and the A4 domain are the second branch electrodes.

Preferably, the first direction and the second direction are both vertical directions.

Figure 2:
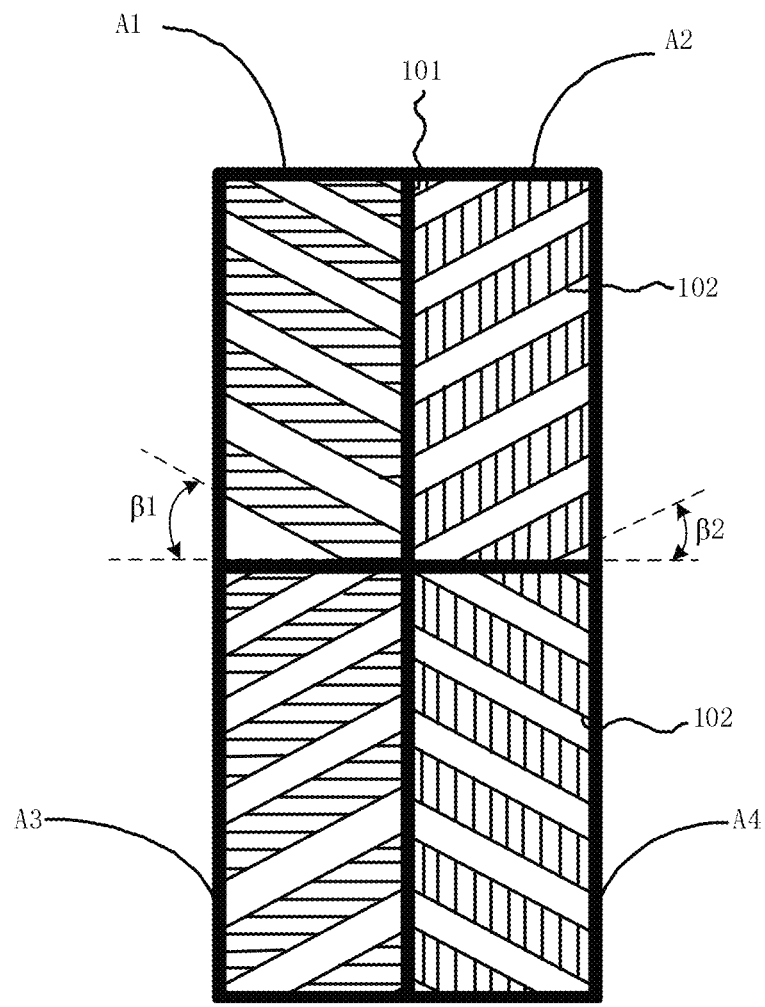
FIG. 2 is a schematic diagram of another pixel structure according to an embodiment of the invention.

For example, referring to FIG. 2, both the A1 domain and the A3 domain are in the first direction, and the branch electrodes in the A1 domain and the A3 domain are the first branch electrodes, both the A2 domain and the A4 domain are in the second direction, and the branch electrodes in the A2 domain and the A4 domain are the second branch electrodes.

Further, the branch electrodes in the two domains on the first diagonal line are the first branch electrodes, and the branch electrodes in the two domains on the second diagonal line are the second branch electrodes.

Figure 3:
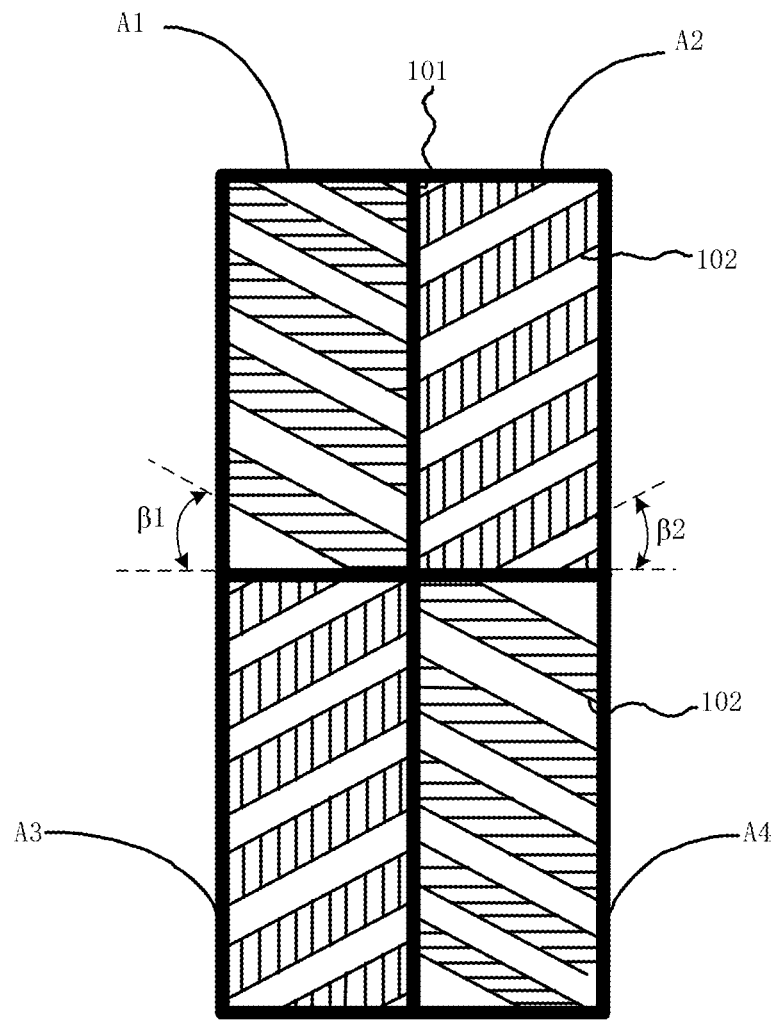
FIG. 3 is a schematic diagram of still another pixel structure according to an embodiment of the invention.

For example, referring to FIG. 3, the A1 domain and the A4 domain are on the first diagonal, and the A2 domain and the A3 domain are on the second diagonal, the branch electrodes in the A1 domain and the A4 domain are all the first branch electrodes, and the branch electrodes in the A2 domain and the A3 domain are the second branch electrodes.

The invention changes the orientation direction of the liquid crystal in the partial domain by designing the acute intersecting angle between the branch electrode and the main electrode in the different domains in the single pixel structure as the first angle β1 and the second angle β2, and the whitening phenomenon of the PSVA type liquid crystal panel when viewed from different viewing angles is solved, and the high transmittance can be maintained, so that the display is uniform and the display effect is improved.

Embodiment 2

Figure 4:
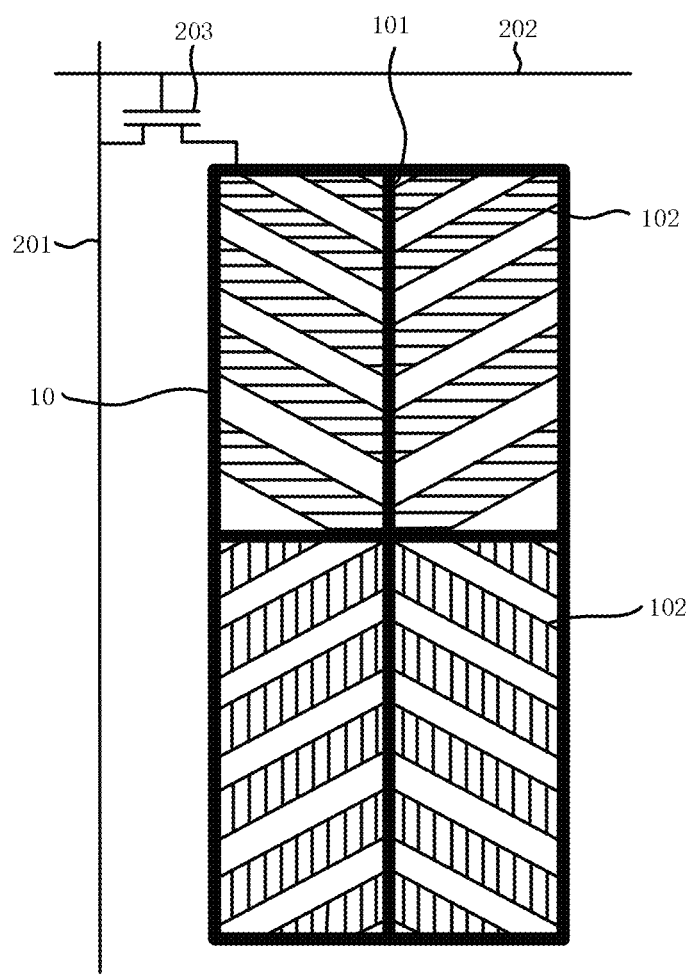
FIG. 4 is a schematic diagram of a pixel unit according to an embodiment of the invention.

Referring to FIG. 4, FIG. 4 is a schematic diagram of a pixel unit according to an embodiment of the invention. An embodiment of the invention further provides a pixel unit, where the pixel unit includes:

a data line 201, a scan line 202;

switching devices 203 electrically connected to the data line 201 and the scan line 202; and a pixel structure 10 electrically connected to the switching device 203.

Wherein, the pixel structure includes:

a main electrode 101;

a plurality of branch electrodes 102 connected to the main electrode 101;

the branch electrode includes a first branch electrode and a second branch electrode, and an acute intersecting angle between the first branch electrode and the main electrode is a first angle, and an acute intersecting angle between the second branch electrode and the main electrode is a second angle.

In this embodiment, referring to FIG. 4, the data line 201 is disposed perpendicular to the scan line 202. It should be noted that, in this embodiment, a pixel structure 10 is carried by the data line 201 and the scan line 202. In an actual display panel, one scan line 202 and one data line 201 correspond to a plurality of pixel structures connected thereto. The data line 201 is used to load the data driving signal onto the pixel structure 10. The data driving signal controls the pixel structure to display colors of different gray scales according to the magnitude of the driving voltage; the scan line 202 is used to load a scan driving signal to the pixel structure, and the scan driving signal controls whether the data driving signal is loaded onto the pixel structure 10. In one embodiment, the data line 201 and the scan line 202 are generally made of a conductive material, and specifically may be a metal element, an alloy, a metal oxide, a metal nitride, a metal oxynitride or a combination of two or more of the above materials.

For the sake of better explanation, in the present embodiment, the switching device 203 is exemplified as a TFT (Thin Film Transistor). Of course, the switching device 203 is not limited to this device as long as the function can be realized. Specifically, the TFT includes a source, a drain, and a gate, wherein the source is connected to the data line 201, the gate is connected to the scan line 202, and the drain is connected to the pixel structure 10. In operation, the scan driving circuit generates a scan driving signal, which is transmitted to the gate of the TFT through the scan line, thereby controlling the gate to be turned on. At this time, the data driving signal generated by the data driving circuit is transmitted to the source of the TFT through the scan line. At this time, since the TFT gate is turned on, the data driving signal of the source is input into the pixel structure 10 to complete one driving.

In a specific embodiment, one pixel unit includes an X row and Y column pixel structure (0<M≤X, 0<N≤Y), and adjacent two rows of pixel structures are mirror-symmetrical. The purpose of this setting can further remove the whitening phenomenon, thereby improving the display effect. For more convenient description, each pixel structure is marked, and the pixel structure of the N-th row and the M-th column is $A_{N,M}$, for example, the pixel structure of the first row and the first column is $A_{1,1}$.

Figure 5:
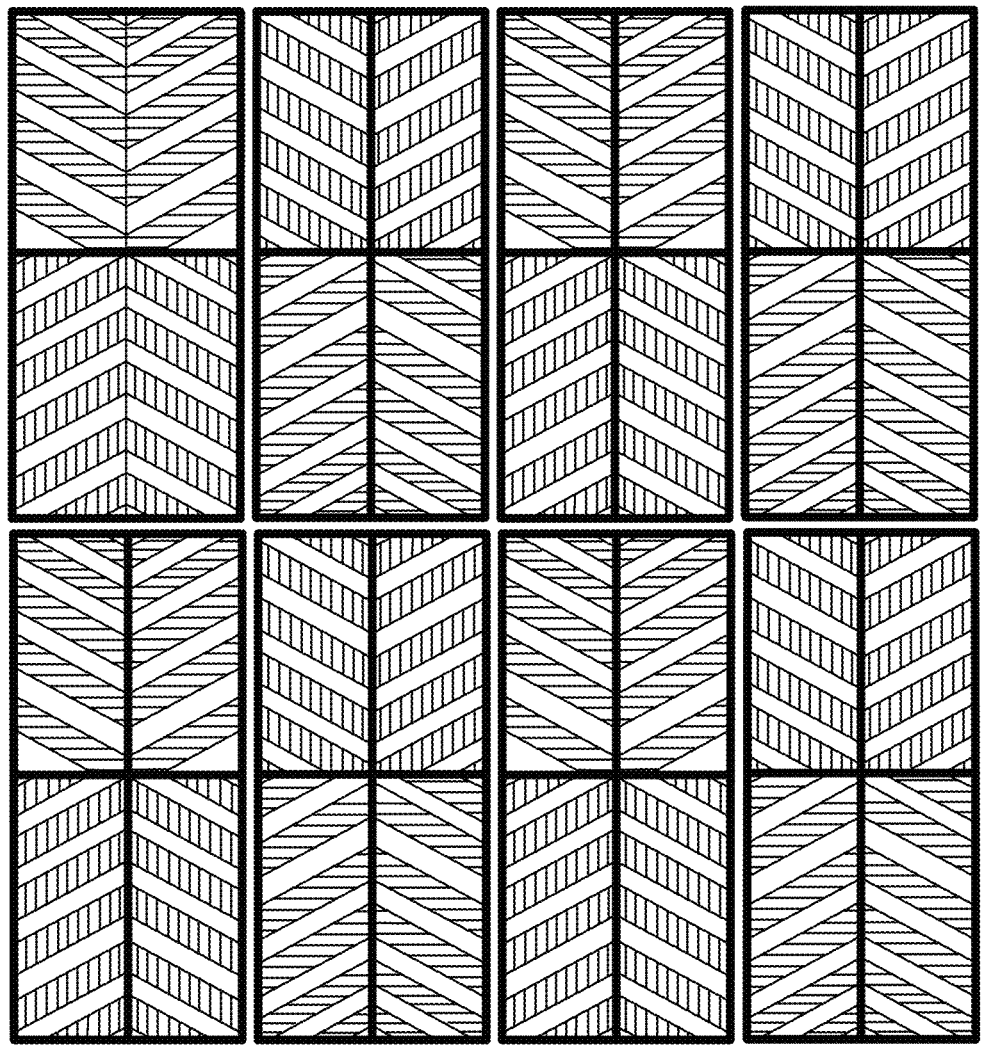
FIG. 5 is a schematic diagram of another pixel unit according to an embodiment of the invention.

In a specific embodiment, referring to FIG. 5, in the pixel structure of the same row, the pixel structure of the M-th row and the N-th column is recorded as $A_{M,N}$, and the pixel structure of the M-th column and the (N+1)-th row is recorded as $A_{M, N+1}$, that is, $A_{M,N}$ and $A_{M,N+1}$ are adjacent two columns of pixel structures, and the pixel structure obtained by rotating the $A_{M,N}$ pixel structure along the horizontal axis of the main electrode 101 by 180° is the pixel structure $A_{M,N+1}$. The purpose of this setting is to optimize the effect of removing the whitening phenomenon, thereby further improving the display effect.

In a specific embodiment, the adjacent two columns of pixel structures have opposite polarities, that is, a polarity column inversion method. For example, when the polarity of the pixel structure of the i-th column is +−+−+−, the polarity of the pixel structure corresponding to the i+1th column is −+−+−+.

In a specific embodiment, a voltage is applied to the pixel structure in a first driving method or a second driving method.

Further, the first driving method includes a first sub driving method and a second sub driving method, and the voltage is applied to the pixel structure alternately in the first sub driving method or the second sub driving method along the scan line direction according to the first predetermined interval.

In a specific embodiment, the data line D1 is connected to the pixel structure $A_{M,1}$, and the corresponding voltage is the first driving voltage, the data line D2 is connected to the pixel structure $A_{M,2}$, and the corresponding voltage is the second driving voltage, the data line DN is connected to the pixel structure $A_{M,N}$, and from the pixel structure $A_{M,2}$ to the pixel structure $A_{M,Y-1}$, is alternately loaded with the first driving voltage or the second driving voltage to the corresponding pixel structure every first interval setting, and the data line DY is connected to the pixel structure $A_{M,Y}$, and the corresponding voltage is the first driving voltage, and the method is the first sub driving method. At the same time, the data line D1 is connected to the pixel structure $A_{M+1,1}$, and the corresponding voltage is the second driving voltage, the data line D2 is connected to the pixel structure $A_{M+1,2}$, and the corresponding voltage is the first driving voltage, and from the pixel structure $A_{M+1,2}$ to the pixel structure $A_{M+1,Y+1}$, alternately loading the corresponding pixel structure with the first driving voltage or the second driving voltage every first interval setting, the data line DY is connected to the pixel structure $A_{M+1,Y}$, and the corresponding voltage is the second driving voltage, which is the second sub driving mode. For example, the data line D1 is connected to the pixel structure $A_{1,1}$, and the corresponding voltage is the first driving voltage, the data line D2 is connected to the pixel structure $A_{1,2}$, and the corresponding voltage is the second driving voltage, the data line DN is connected to the pixel structure $A_{1,N}$, and from the pixel structure $A_{1,2}$ to the pixel structure $A_{1,Y-1}$, is alternately loaded with the first driving voltage or the second driving voltage to the corresponding pixel structure every first interval setting, and the data line DY is connected to the pixel structure $A_{1,Y}$, and the corresponding voltage is the first driving voltage, and the method is the first sub driving method. At the same time, when a voltage is applied to the pixel structure corresponding to the scan line G1 in the first sub driving method, a voltage is applied to the pixel structure corresponding to the scan line G2 in the second sub driving method described below; the data line D1 is connected to the pixel structure $A_{2,1}$, and the corresponding voltage is the second driving voltage, the data line D2 is connected to the pixel structure $A_{2,2}$, and the corresponding voltage is the first driving voltage, and from the pixel structure $A_{2,2}$ to the pixel structure $A_{2,Y-1}$, alternately loading the corresponding pixel structure with the first driving voltage or the second driving voltage every first interval setting, the data line DY is connected to the pixel structure $A_{2,Y}$, and the corresponding voltage is the first driving voltage, which is the second sub driving method. And so on, in the direction of the scan line, alternately load the voltage to the pixel structure in the first sub driving method or the second sub driving method. In this embodiment, the first predetermined interval is every other pixel structure in the direction of the scan line, and the adjacent scan lines alternately load the first sub driving method and the second sub driving method.

In this embodiment, the first predetermined interval and the first interval setting are set according to actual needs, which is not specifically limited in this embodiment.

In this embodiment, the first sub driving method and the second sub driving mode are sufficient to apply a voltage to the pixel structure in an alternating manner.

Figure 6:
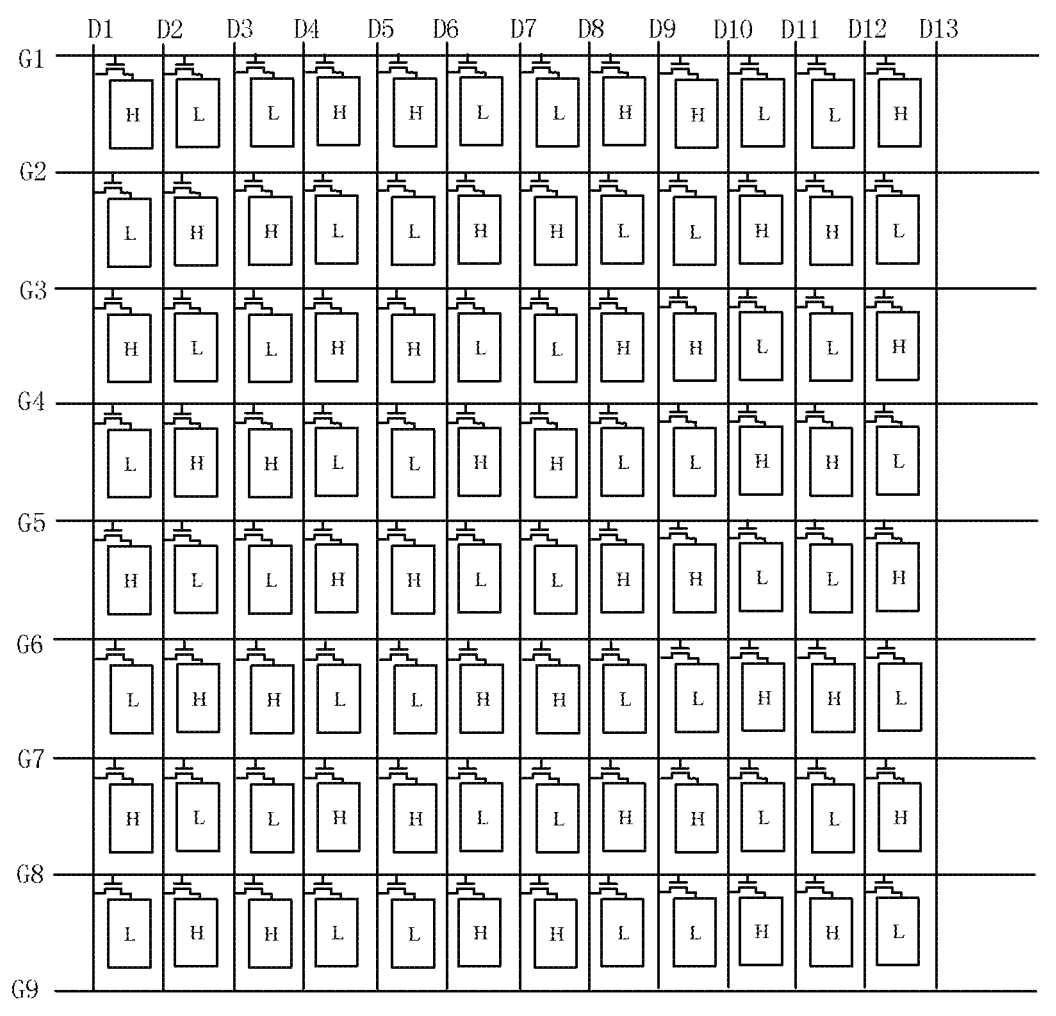

For example, referring to FIG. 6, taking 8×12 as an example, the pixel structure includes 8 rows and 12 columns, and the first interval setting is every two pixel structures.

The data line D1 is connected to the pixel structure $A_{1,1}$, and the voltage corresponding to the pixel structure $A_{1,1}$ is the first driving voltage. The data line D2 and the data line D3 are connected to the pixel structure $A_{1,2}$ and the pixel structure $A_{1,3}$, respectively, and the voltages corresponding to the pixel structure $A_{1,2}$ and the pixel structure $A_{1,3}$ are the second driving voltage. The data line D4 and the data line D5 are connected to the pixel structures $A_{1,4}$ and the pixel structures $A_{1,5}$, respectively, and the voltages corresponding to the pixel structures $A_{1,4}$ and the pixel structures $A_{1,5}$ are the first driving voltage. Similarly, the data line D10 and the data line D11 are connected to the pixel structures $A_{1,10}$ and the pixel structures $A_{1,11}$, respectively, and the voltages corresponding to the pixel structures $A_{1,10}$ and the pixel structures $A_{1,11}$ are the second driving voltage. The data line D12 is connected to the pixel structures $A_{1,12}$, and the voltage corresponding to the pixel structures $A_{1,12}$ is the first driving voltage; at the same time, the data line D1 is connected to the pixel structure $A_{2,1}$, and the voltage corresponding to the pixel structure $A_{2,1}$ is the second driving voltage. The data line D2 and the data line D3 are connected to the pixel structure $A_{2,2}$ and the pixel structure $A_{2,3}$, respectively, and the voltages corresponding to the pixel structure $A_{2,2}$ and the pixel structure $A_{2,3}$ are the first driving voltage. The data line D4 and the data line D5 are respectively connected to the pixel structure $A_{2,4}$ and the pixel structure $A_{2,5}$, and the voltages corresponding to the pixel structure $A_{2,4}$ and the pixel structure $A_{2,5}$ are the second driving voltage, and so on. The data line D10 and the data line D11 are connected to the pixel structures $A_{2,10}$ and the pixel structures $A_{2,11}$, respectively, and the voltages corresponding to the pixel structures $A_{2,10}$ and the pixel structures $A_{2,11}$ are the first driving voltage. The data line D12 is connected to the pixel structure $A_{2,12}$, and the voltage corresponding to the pixel structure $A_{2,12}$ is the second driving voltage, and so on. In the direction of the scan line, the voltage is applied to the pixel structure alternately in the first sub driving method or the second sub driving method.

In an embodiment, in the direction of the scan line, the voltage is applied to the pixel structure alternately in the first sub driving method or the second sub driving method according to the first predetermined interval. At the same time, the pixel unit utilizes the polarity column inversion method, thereby further improving the whitening phenomenon while maintaining a high transmittance.

On the basis of the pixel structure obtained in the first embodiment, the pixel structure of the pixel unit is loaded with a voltage in a first driving method, and the pixel unit is reversed by a polarity column, thereby further improving the whitening phenomenon. At the same time, it can maintain a high transmittance, making the display uniform and improving the display effect.

Further, the second driving method includes a third sub driving method and a fourth sub driving method, and in the direction of the scan line, the voltage is applied to the pixel structure alternately in a third sub driving method or a fourth sub driving method according to the second predetermined interval.

In a specific embodiment, in the scan line direction, from the pixel structure $A_{M1}$ to the pixel structure $A_{MY}$, the first driving voltage or the second driving voltage is alternately loaded onto the corresponding pixel structure every second interval setting. For example, when the second interval setting is every two pixel structures, the data line D1 and the data line D2 are respectively connected to the pixel structure $A_{M,1}$ and the pixel structure $A_{M,2}$, the pixel structure $A_{M,1}$ and the pixel structure $A_{M,2}$ are voltages of the first driving voltage, the data line D3 and the data line D4 are respectively connected to the pixel structure $A_{M,3}$ and the pixel structure $A_{M,4}$, the pixel structure $A_{M,3}$ and the pixel structure $A_{M,4}$ are voltages of the second driving voltage, the data line D5 and the data line D6 are respectively connected to the pixel structure $A_{M,5}$ and the pixel structure $A_{M,6}$, the pixel structure $A_{M,5}$ and the pixel structure $A_{M,6}$ are voltages of the first driving voltage, and so on, this method is the third sub driving method. At the same time, the data line D1 and the data line D2 are respectively connected to the pixel structure $A_{M+1,1}$ and the pixel structure $A_{M+1,2}$, and the voltages corresponding to the pixel structure $A_{M+1,1}$ and the pixel structure $A_{M+1,2}$ are the second driving voltage, the data line D3 and the data line D4 are respectively connected to the pixel structure $A_{M+1,3}$ and the pixel structure $A_{M+1,4}$, and the voltages corresponding to the pixel structure $A_{M+1,3}$ and the pixel structure $A_{M+1,4}$ are the first driving voltage, the data line D5 and the data line D6 are respectively connected to the pixel structure $A_{M+1,5}$ and the pixel structure $A_{M+1,6}$, the voltages corresponding to the pixel structure $A_{M+1,5}$ and the pixel structure $A_{M+1,6}$ are all the second driving voltage, and so on, which is the fourth sub driving method. In the direction of the scan line, voltages are alternately applied to the pixel structure in a third sub driving method or a fourth sub driving method. For example, the data line D1 and the data line D2 are respectively connected to the pixel structure $A_{11}$ and the pixel structure $A_{12}$, and the voltages of the pixel structure $A_{11}$ and the pixel structure $A_{12}$ are both the first driving voltage, the data line D3 and the data line D4 are connected to the pixel structure $A_{1,3}$ and the pixel structure $A_{1,4}$, respectively, and the voltages of the pixel structure $A_{1,3}$ and the pixel structure $A_{1,4}$ are the second driving voltage, the data line D5 and the data line D6 are respectively connected to the pixel structure $A_{1,5}$ and the pixel structure $A_{1,6}$, and the voltages of the pixel structure $A_{1,5}$ and the pixel structure $A_{1,6}$ are the first driving voltage, and so on, which is the third sub driving method. At the same time, when a voltage is applied to the pixel structure corresponding to the scan line G1 in the third sub driving method, a voltage is applied to the pixel structure corresponding to the scan line G2 in the fourth sub driving method described below; the data line D1 and the data line D2 are respectively connected to the pixel structure $A_{2,1}$ and the pixel structure $A_{2,2}$, and the voltages of the pixel structure $A_{2,1}$ and the pixel structure $A_{2,2}$ are the second driving voltage, the data line D3 and the data line D4 are respectively connected to the pixel structure $A_{2,3}$ and the pixel structure $A_{2,4}$, the pixel structure $A_{2,3}$ and the pixel structure $A_{2,4}$ are the first driving voltage, the data line D5 and the data line D6 are respectively connected to the pixel structure $A_{2,5}$ and the pixel structure $A_{2,6}$, and the voltages of the pixel structure $A_{2,5}$ and the pixel structure $A_{2,6}$ are the first driving voltage, and so on, which is the fourth sub driving method. Similarly, in the direction of the scan line, the voltage is applied to the pixel structure alternately in the third sub driving method or the fourth sub driving method. In the second predetermined interval in the embodiment, that is, every other pixel structure in the scan line direction, that is, the adjacent scan lines alternately load the third sub driving method and the fourth sub driving method.

In the second predetermined interval in the embodiment, that is, every other pixel structure in the scan line direction, that is, the adjacent scan lines alternately load the third sub driving method and the fourth sub driving method.

In this embodiment, the second predetermined interval and the second interval setting are set according to actual needs, which is not specifically limited in this embodiment.

In this embodiment, the third sub driving method and the fourth sub driving method are sufficient to apply a voltage to the pixel structure in an alternating manner.

Figure 7:
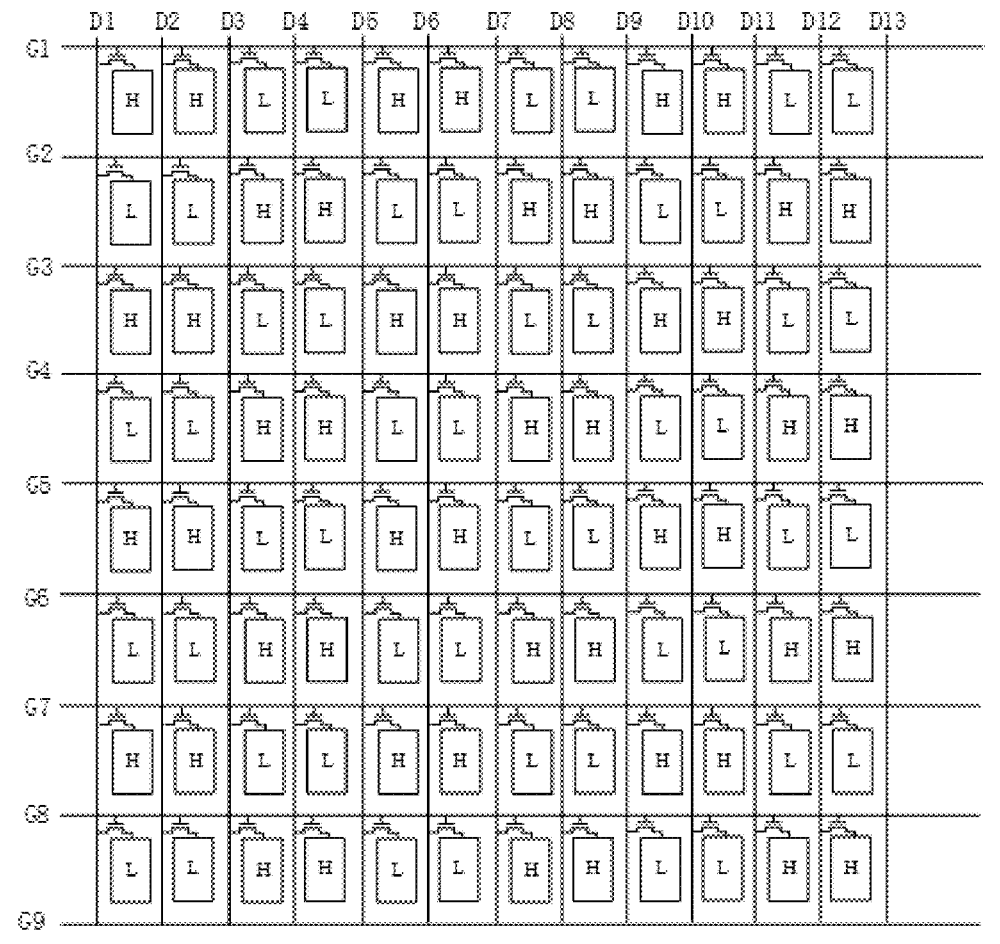

For example, referring to FIG. 7, taking 8×12 as an example, the pixel structure includes 8 rows and 12 columns, and the second interval setting is every two pixel structures in the data line direction.

The data line D1 and the data line D2 are respectively connected to the pixel structure $A_{1,1}$ and the pixel structure $A_{1,2}$, and the voltage corresponding to the pixel structure $A_{1,1}$ and the pixel structure $A_{1,2}$ is the first driving voltage, the data line D3 and the data line D4 are respectively connected to the pixel structure $A_{1,3}$ and the pixel structure $A_{1,4}$, and the voltages corresponding to the pixel structure $A_{1,3}$ and the pixel structure $A_{1,4}$ are the second driving voltage, the data line D5 and the data line D6 are respectively connected to the pixel structure $A_{1,5}$ and the pixel structure $A_{1,6}$, the pixel structure $A_{1,5}$ and the pixel structure $A_{1,6}$ corresponding to the voltage is the first driving voltage, the data line D11 and the data line D12 are respectively connected to the pixel structures $A_{1,11}$ and the pixel structures $A_{1,12}$, and the voltages corresponding to the pixel structures $A_{1,11}$ and the pixel structures $A_{1,12}$ are all the second driving voltage; the data line D1 and the data line D2 are respectively connected to the pixel structure $A_{2,1}$ and the pixel structure $A_{2,2}$, and the voltage corresponding to the pixel structure $A_{1,1}$ and the pixel structure $A_{1,2}$ is the second driving voltage, the data line D3 and the data line D4 are respectively connected to the pixel structure $A_{2,3}$ and the pixel structure $A_{2,4}$, the pixel structure $A_{2,3}$ and the pixel structure $A_{2,4}$ corresponding to the voltage are the first driving voltage, the data line D5 and the data line D6 are respectively connected to the pixel structure $A_{2,5}$ and the pixel structure $A_{2,6}$, the pixel structure $A_{2,5}$ and the pixel structure $A_{2,6}$ corresponding to the voltage is the second driving voltage, the data line D11 and the data line D12 are respectively connected to the pixel structures $A_{2,11}$ and the pixel structures $A_{2,12}$, and the voltages corresponding to the pixel structures $A_{2,11}$ and the pixel structures $A_{2,12}$ are the first driving voltage, and so on. In the direction of the scan line, the voltage is applied to the pixel structure alternately in the first sub driving method or the second sub driving method.

In an embodiment, in the direction of the scan line, the voltage is applied to the pixel structure in a third sub driving method or a fourth sub driving method alternately according to the second predetermined interval. At the same time, the pixel unit utilizes the polarity column inversion method, thereby further improving the whitening phenomenon while maintaining a high transmittance.

On the basis of the pixel structure obtained in the first embodiment, the pixel structure of the pixel unit is loaded with a voltage by the second driving method, and the pixel unit is reversed by the polarity column, so that the whitening phenomenon can be further improved. At the same time, it can maintain a high transmittance, making the display uniform and improving the display effect.

In this embodiment, the first gray scale data and the second gray scale data are formed according to the original pixel data, and the pixel gray scales of the first gray scale data and the second gray scale data are different, the first driving voltage is generated according to the first gray scale data, and the second driving voltage is generated according to the second gray scale data; and in a frame, the first driving voltage or the second driving voltage is loaded to the pixel structure along the data line direction. In this way, it is possible to prevent the voltage applied to the pixel structure from being affected by the polarity inversion, thereby avoiding the occurrence of crosstalk and bright and dark lines.

In a specific example, the first gray scale data is considered to be high gray scale data, and the second gray scale data is considered to be low gray scale data, correspondingly, the magnitude of the voltage input to the pixel structure is determined by the gray scale, and the high gray scale voltage corresponding to the high gray scale data is generated, that is, the first driving voltage; a low gray scale voltage corresponding to the low gray scale data, that is, a second driving voltage, It is worth mentioning that the above-mentioned high gray scale and low gray scale represent the relative values of the gray scale sizes of the two groups, and the magnitude of the values is not individually limited.

On the basis of the pixel structure obtained in the first embodiment, the voltage is applied to different pixel structures of the pixel unit by using the first driving voltage and the second driving voltage. At the same time, the pixel unit utilizes the polarity column inversion method, so that the whitening phenomenon can be further improved, and at the same time, the high transmittance can be maintained, the display is uniform, and the display effect is improved.

Figure 8:
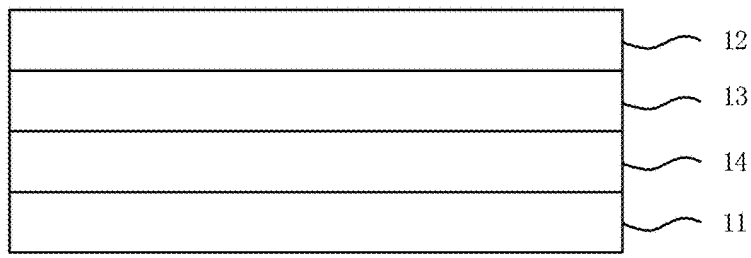
FIG. 8 is a schematic diagram of a display panel according to an embodiment of the invention.

Referring to FIG. 8, an embodiment of the invention further provides a display panel, including:

a first substrate 11;

a second substrate 12 located opposite to the first substrate 11;

a pixel unit 14 disposed between the first substrate and the second substrate; and a liquid crystal material 13 located between the first substrate and the second substrate.

The material of the first substrate and the second substrate may be a semiconductor material such as glass or quartz, or may be an organic polymer or the like, and the material of the first substrate may be the same as or different from the material of the second substrate. The liquid crystal material 13 is mainly composed of liquid crystal molecules, and the liquid crystal molecules are correspondingly disposed between adjacent two branch electrodes in each pixel unit, so that after the voltage is applied, the liquid crystal molecules reach a better alignment, thereby improving the light transmittance, thereby improving the display effect.

The pixel unit and the display panel of the embodiment of the invention can achieve the dual purpose of improving the whitening phenomenon of the viewing angle without changing the process conditions, and can also maintain a high transmittance.

Figure 9:
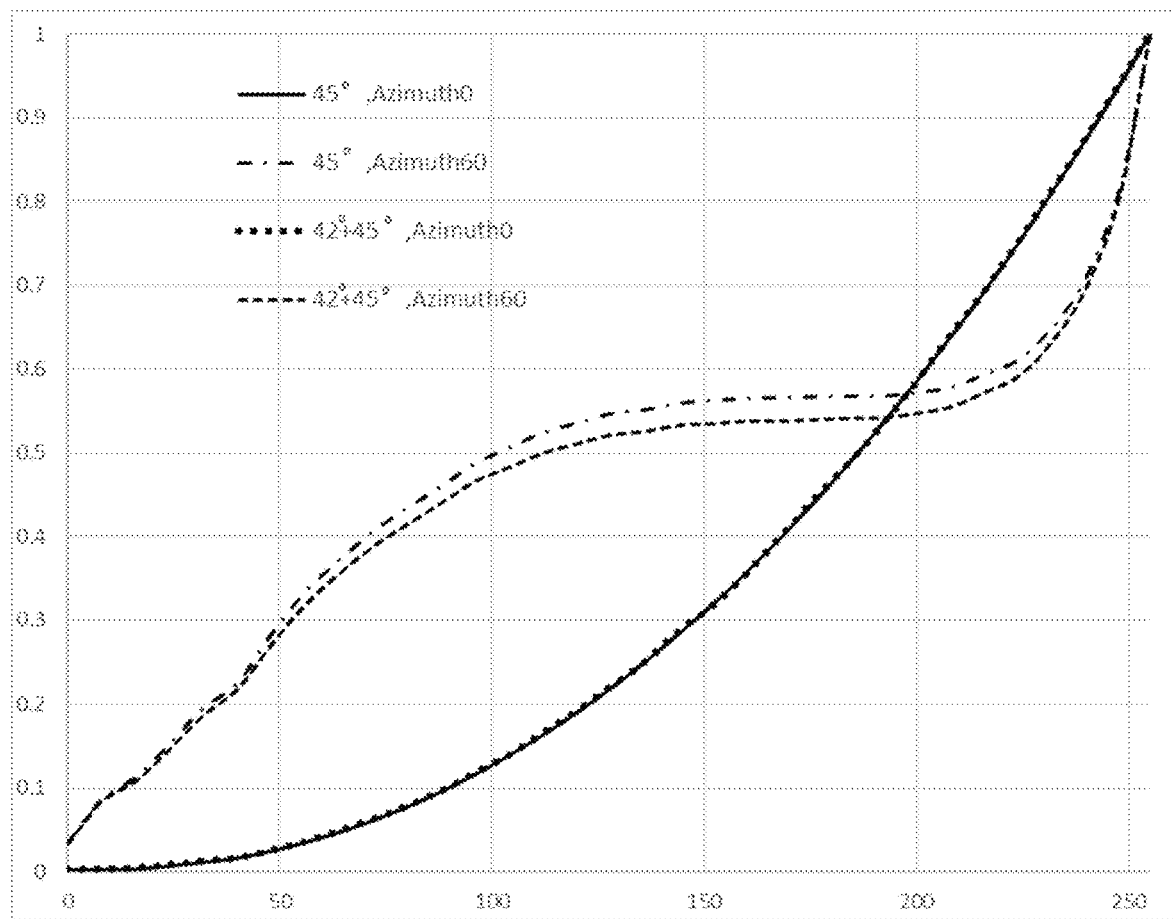
FIG. 9 is a schematic diagram of an observation result on a display panel according to an embodiment of the invention.

Referring to FIG. 9, the abscissa corresponds to a gray scale, and the ordinate corresponds to a normalized value of the brightness. 45 degrees, Azimuth0 represents the display panel with an angle of 45 degrees between the branch electrode and the main electrode in the existing design, and the viewing angle is positive. 45 degrees, Azimuth60 represents the display panel with an angle of 45 degrees between the branch electrode and the main electrode in the existing design, and the viewing angle is 60 degrees from the angle of the display panel. 42+45 degrees, Azimuth0 is a display panel provided by an embodiment of the invention, representing a display panel with two domains in a pixel structure having an angle of 45 degrees with the main electrode and an angle of 42 degrees between the branch electrodes of the other two domains and the main electrode, the viewing angle is a front view. 42+45 degrees, Azimuth 60 is a display panel provided by an embodiment of the invention, and the viewing angle is 60 degrees with the display panel.

Embodiment 3

Figure 10:
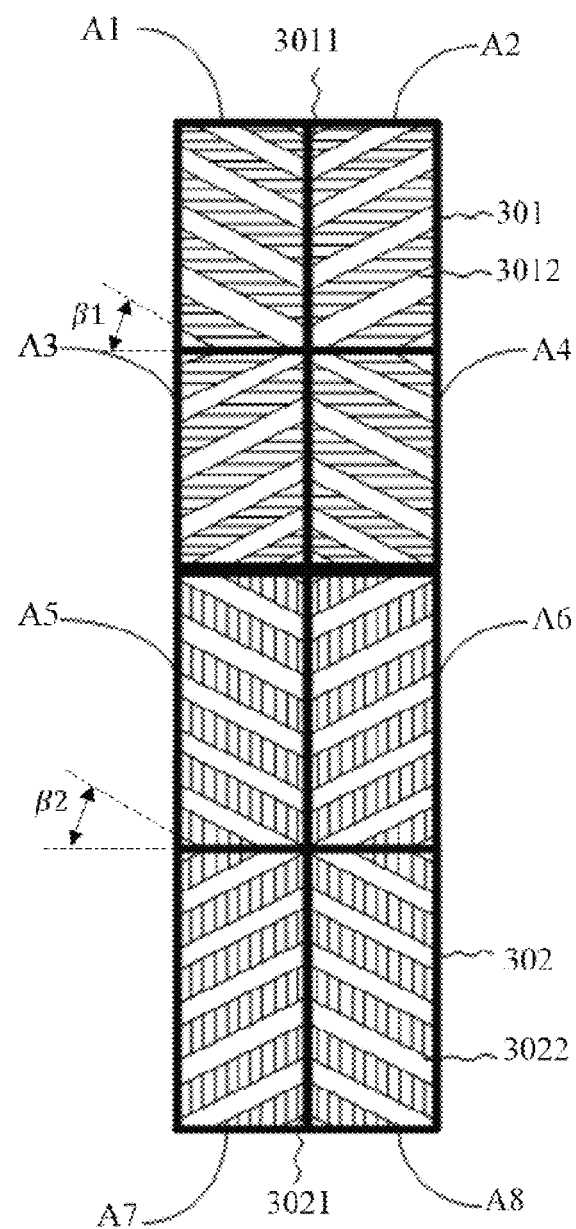
FIG. 10 is a schematic structural diagram of a pixel according to an embodiment of the invention.

Referring to FIG. 10, FIG. 10 is a schematic structural diagram of a pixel according to an embodiment of the invention. The pixel structure of this embodiment includes: a first sub pixel structure 301 and a first sub pixel structure 302, wherein:

the first sub pixel structure 301 includes a first main electrode 3011 and a first branch electrode 3012, and the first branch electrode 3012 is connected to the first main electrode 3011, an acute intersecting angle between the first branch electrode 3012 and the first main electrode 3011 is a first angle β1;

the second sub pixel structure 302 includes a second main electrode 3021 and a second branch electrode 3022, and the second branch electrode 3022 is connected to the second main electrode 3021, an acute intersecting angle between the second branch electrode 3022 and the second main electrode 3021 is a second angle β2.

In a specific embodiment, the first angle β1 is greater than or equal to 40 degrees and less than 45 degrees, and the second angle β2 is equal to 45 degrees.

Figure 11:
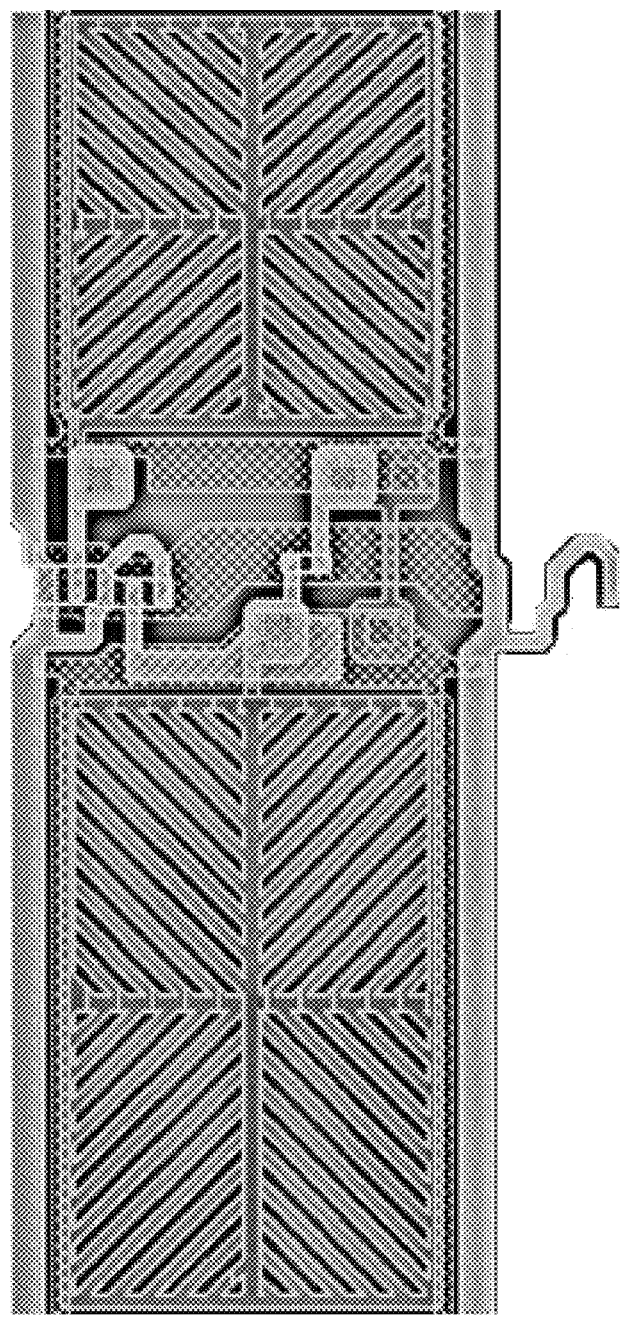
FIG. 11 is a schematic structural diagram of another pixel according to an embodiment of the invention.

In this embodiment, referring to FIG. 11, the first sub pixel structure corresponds to a bright area, and when in a low gray scale (below 32 gray scales), only the first sub pixel structure drives illumination, the second sub pixel structure corresponds to a dark area, and at a high gray scale (above 32 gray scales), the second sub pixel structure also begins to drive illumination.

An acute intersecting angle between the first branch electrode and the first main electrode in the first sub pixel structure is a first angle β1, and the first angle β1 is set to be greater than or equal to 40 degrees and less than 45 degrees. At the same time, the acute intersecting angle between the second branch electrode and the second main electrode in the second sub pixel structure is a second angle β2, and the second angle β2 is set equal to 45 degrees. It can be made that when the low gray scale (for example, the low gray scale is below 32 gray scale), only the first sub pixel structure drives the light, thereby removing the whitening phenomenon which occurs in side view, when the high gray scale (for example, the high gray scale is above 32 gray scales), the second sub pixel structure also starts to drive light, thereby ensuring a high transmittance of the pixel structure, thereby making the display more uniform and improving the display effect.

Preferably, the first angle β1 is 42 degrees.

When the angle β1 between the first branch electrode 3012 and the main electrode of the main electrode is 42 degrees, and the angle β2 between the second branch electrode 3022 and the main electrode is 42 degrees, the effect of removing the whitish phenomenon in side view is best, and the pixel structure can be ensured to have a high transmittance.

The first main electrode 3011 and the second main electrode 3021 in this embodiment are strip-shaped, the first branch electrode 3011 is a first branch electrode 3012, and each of the first branch electrodes 3012 is also strip-shaped, and is connected to the first main electrode 3011, a slit is formed between the gaps between each adjacent two first branch electrodes 3012 and extends to an edge position of the first sub pixel structure 301, which is generally referred to as an alignment slit; the second branch electrode 3021 is a second branch electrode 3022 on both sides, and each of the second branch electrodes 3022 is also strip-shaped and connected to the second main electrode 3021, a slit is formed between the gaps between each adjacent two second branch electrodes 3022 and extends to an edge position of the second sub pixel structure 302 while the first sub pixel structure is connected to the second sub pixel structure.

In a specific embodiment, the first main electrode 3011 is a cross-shaped electrode, the first main electrode 3011 divides the first sub pixel structure 301 into four first domains, and adjacent two of the first branch electrodes 3012 in any one of the first domains are parallel to each other.

In a specific embodiment, the angle between the first branch electrode and the horizontal direction of the first main electrode is a first angle β1.

In a specific embodiment, referring again to FIG. 10, the first main electrode 3011 is a cross-shaped electrode, and the cross-shaped electrode divides the first sub pixel structure 301 into four first domains, namely, A1, A2, A3, and A4, wherein the A1 domain is adjacent to the A2 domain and the A3 domain. In the above four first domains, the first branch electrodes 3012 in each of the first domains are connected to the first main electrode 3011 to interconnect the electrodes. For one of the four first domains, all of the first branch electrodes 3012 in each first domain have the same tilt direction, that is, the adjacent two first branch electrodes 3012 in any one of the first domains, are parallel to each other.

Taking the A1 domain as an example, the A1 domain relative position is located at the upper left of the first sub pixel structure 301, and the tilt direction of the first branch electrode 3012 in the first domain is also inclined toward the upper left direction.

Preferably, the first branch electrodes 3012 of the adjacent two first domains are not parallel to each other.

That is, taking the A2 domain as an example, the A2 domain relative position is located at the upper right of the first sub pixel structure 301, and the tilt direction of the first branch electrode 3012 in the first domain is also inclined toward the upper right direction. Taking the A3 domain as an example, the A3 domain relative position is located at the lower left of the first sub pixel structure 301, and the tilt direction of the first branch electrode 3012 in the first domain is also inclined toward the lower left direction. Taking the A4 domain as an example, the A4 domain relative position is located at the lower right of the first sub pixel structure 301, and the tilt direction of the first branch electrode 3012 in the first domain is also inclined toward the lower right direction. That is, the orientation of any one of the first branch electrodes 3012 in the A1 domain and the first branch electrode 3012 in the A2 domain is different. That is, the first branch electrode 3012 in the A1 domain is not parallel to the first branch electrode 3012 in the A2 domain. Similarly, the first branch electrode 3012 in the A1 domain is not parallel to the first branch electrode 3012 in the A3 domain. The orientation of the above electrodes can be set to improve the display color shift after voltage application.

In a specific embodiment, the second main electrode 3021 is a cross-shaped electrode, the second main electrode 3021 divides the second sub pixel structure into four second domains, and adjacent two of the second branch electrodes of any one of the second domains are parallel to each other.

In a specific embodiment, the angle between the second branch electrode 3022 and the second main electrode 3021 in the horizontal direction is a second angle β2.

In a specific embodiment, referring again to FIG. 10, the second main electrode 3021 is a cross-shaped electrode, and the cross-shaped electrode divides the second sub pixel structure 302 into four second domains, namely, A5, A6, A7, and A8. The A5 domain is adjacent to the A6 domain and the A7 domain. The second branch electrodes 3022 of each of the four second domains are connected to the second main electrode 3021 to interconnect the electrodes. For one of the four second domains, the inclination directions of all the second branch electrodes 3022 in each second domain are the same, that is, the adjacent two second branch electrodes 3022 in any one of the second domains are parallel to each other.

Taking the A5 domain as an example, the A5 domain relative position is located at the upper left of the second sub pixel structure 302, and the tilt direction of the second branch electrode 3022 of the second domain is also inclined toward the upper left direction.

Preferably, the second branch electrodes 3022 of the adjacent two second domains are not parallel to each other.

Taking the A6 domain as an example, the relative position of the A6 domain is located at the upper right of the second sub pixel structure 302, and the tilt direction of the second branch electrode 3022 of the second domain is also inclined toward the upper right direction. Taking the A7 domain as an example, the relative position of the A7 domain is located at the lower left of the second sub pixel structure 302, and the tilt direction of the second branch electrode 3022 of the second domain is also inclined toward the lower left direction. Taking the A8 domain as an example, the relative position of the A8 domain is located at the lower right of the second sub pixel structure 302, and the tilt direction of the second branch electrode 3022 of the second domain is also inclined toward the lower right direction. That is, the orientation of any one of the second branch electrodes 3022 in the A5 domain and the second branch electrode 3022 of the A6 domain is different. That is, the second branch electrode 3022 in the A5 domain is not parallel to the second branch electrode 3022 in the A6 domain. Similarly, the second branch electrode 3022 in the A5 domain is not parallel to the second branch electrode 3022 in the A7 domain. The orientation of the above electrodes can be set to improve the display color shift after voltage application.

In a specific embodiment, referring again to FIG. 10, adjacent two first domains are symmetric along the first main electrode 3011, and the first main electrode 3011 is a cross-shaped electrode. In the first sub pixel structure 301, the A1 domain is adjacent to the A2 domain and the A3 domain, and the A1 domain and the A2 domain are symmetric along the longitudinal axis of the first main electrode 3011, and the A1 domain and the A3 domain are symmetric along the horizontal axis of the first main electrode 3011; the A4 domain is adjacent to the A2 domain and the A3 domain, and the A2 domain and the A4 domain are symmetric along the horizontal axis of the first main electrode 3011, and the A3 domain and the A4 domain are symmetric along the longitudinal axis of the first main electrode 3011.

In a specific embodiment, referring again to FIG. 10, adjacent two second sections are symmetric along the second main electrode 3021, and the second main electrode 3021 is a cross-shaped electrode. In the second sub pixel structure 302, the A5 domain is adjacent to the A6 domain and the A7 domain, and the A5 domain and the A6 domain are symmetric along the longitudinal axis of the second main electrode 3021, and the A5 domain and the A7 domain are symmetric along the horizontal axis of the second main electrode 3021; the A8 domain is adjacent to the A6 domain and the A7 domain, and the A6 domain and the A8 domain are symmetric along the horizontal axis of the second main electrode 3021, and the A7 domain and the A8 domain are symmetric along the longitudinal axis of the second main electrode 3021.

In this embodiment, the adjacent two first domains are symmetrically disposed along the first main electrode, and the adjacent two second domains are symmetrically disposed along the second main electrode, which can further improve the whitening phenomenon when viewed from different viewing angles, thereby improving the display effect.

In the embodiment of the invention, the angle between the first branch electrode and the first main electrode in the first sub pixel structure is a first angle β1, and the acute intersecting angle between the second branch electrode and the second main electrode in the second sub pixel structure is a second angle β2. So that in the low gray scale, only the first sub pixel structure drives the light, thereby removing the whitening phenomenon that occurs in side view, at the high gray scale, the second sub pixel structure also starts to drive the light, thereby ensuring a high transmittance of the pixel structure, thereby making the display more uniform and improving the display effect.

Embodiment 4

In addition, the embodiment of the invention further provides a pixel unit, where the pixel unit includes:
a data line, a scan line;
switching devices electrically connecting the data line and the scan line;
a pixel structure electrically connecting the switching elements.

Wherein, the pixel structure (refer to FIG. 10) includes:
a first sub pixel structure 301 and a first sub pixel structure 302, wherein:
the first sub pixel structure 301 includes a first main electrode 3011 and a first branch electrode 3012, and the first branch electrode 3012 is connected to the first main electrode 3011, an acute intersecting angle between the first branch electrode 3012 and the first main electrode 3011 is a first angle β1;
the second sub pixel structure 302 includes a second main electrode 3021 and a second branch electrode 3022, and the second branch electrode 3022 is connected to the second main electrode 3021, an acute intersecting angle between the second branch electrode 3022 and the second main electrode 3021 is a second angle β2.

In this embodiment, the data lines are arranged perpendicular to the scan lines, it should be noted that, in this embodiment, a pixel structure is carried by a data line and a scan line. In an actual display panel, one scan line and one data line correspond to a plurality of pixel structures on which the load is connected, the data line is used to load the data driving signal onto the pixel structure, and the data driving signal controls the pixel structure to display colors of different gray scales according to the magnitude of the driving voltage; the scan line is used to load the scan driving signal to the pixel structure, and the scan driving signal controls whether the data driving signal is loaded onto the pixel structure. In one embodiment, the data lines and the scan lines are generally made of a conductive material, and may be a metal element, an alloy, a metal oxide, a metal nitride, a metal oxynitride or a combination of two or more of the above materials.

For better explanation, the present embodiment is exemplified by the case where the switching device is a TFT. Of course, the switching device is not limited to the device as long as the function can be realized. Specifically, the TFT includes a source, a drain, and a gate, wherein the source is connected to the data line, the gate is connected to the scan line, and the drain is connected to the pixel structure. In operation, the scan driving circuit generates a scan driving signal, which is transmitted to the gate of the TFT through the scan line, thereby controlling the gate to be turned on. At this time, the data driving signal generated by the data driving circuit is transmitted to the source of the TFT through the scan line. At this time, since the TFT gate is turned on, the data driving signal of the source is input into the pixel structure to complete one driving.

Furthermore, the embodiment of the invention further provides a display panel (please refer to FIG. 8 again), including:

a first substrate 11;

a second substrate 12 located opposite to the first substrate 11;

a pixel unit 14 disposed between the first substrate and the second substrate, for the structure, refer to the detailed description of the pixel unit in the fourth embodiment; and a liquid crystal material 13 located between the first substrate and the second substrate.

The material of the first substrate and the second substrate may be a semiconductor material such as glass or quartz, or may be an organic polymer or the like, and the material of the first substrate may be the same as or different from the material of the second substrate. The main component of the liquid crystal material 13 is liquid crystal molecules, and liquid crystal molecules are correspondingly disposed between adjacent two first branch electrodes or two second branch electrodes in each pixel unit, so that the liquid crystal molecules can be better aligned after the voltage is applied, and the light transmittance is improved, thereby improving the display effect.

The pixel unit and the display panel of the embodiment of the invention can achieve the dual purpose of improving the whitening phenomenon of the viewing angle without changing the process conditions, and can also maintain a high transmittance.

Embodiment 5

Figure 12:
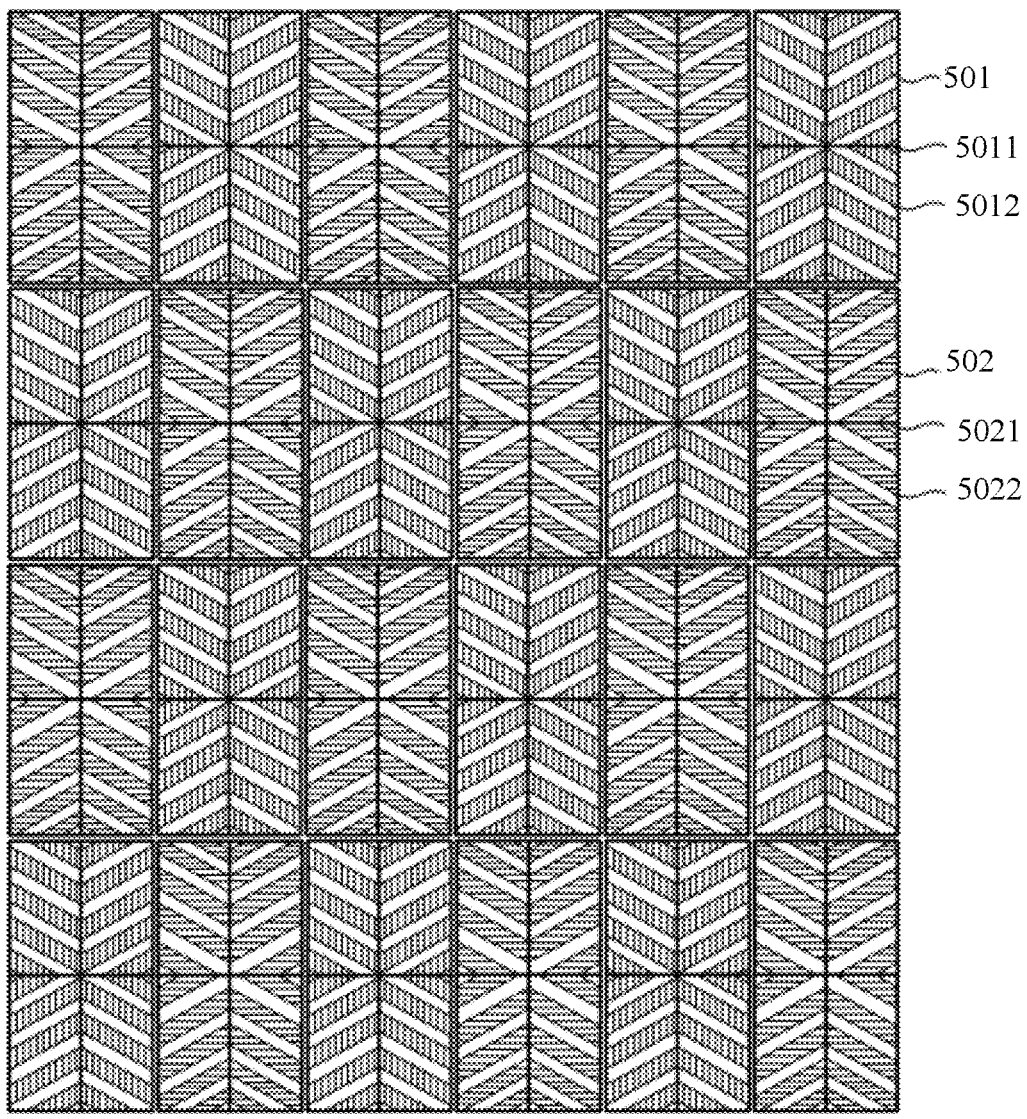
FIG. 12 is a schematic structural diagram of a pixel unit according to an embodiment of the invention.

Referring to FIG. 12, FIG. 12 is a schematic structural diagram of a pixel unit according to an embodiment of the invention. The pixel structure of this embodiment includes:

a first pixel structure 501 including a first main electrode 5011 and a first branch electrode 5012 connected to the first main electrode 5011, an acute intersecting angle between the first branch electrode 5012 and the first main electrode 5011 is a first angle; and a second pixel structure 502 including a second main electrode 5021 and a second branch electrode 5022 connected to the second main electrode 5021, an acute intersecting angle between the second branch electrode 5022 and the second main electrode 5021 is a second angle.

In a specific embodiment, the first angle is greater than or equal to 40 degrees and less than 45 degrees, and the second angle is equal to 45 degrees.

The pixel unit of this embodiment includes a first pixel structure and a second pixel structure, and an acute intersecting angle between the first branch electrode of the first pixel structure and the first main electrode is a first angle. Wherein, the first angle is greater than or equal to 40 degrees and less than 45 degrees, and an acute intersecting angle between the second branch electrode of the second pixel structure and the second main electrode is a second angle, the second angle is equal to 45 degrees, which solves the whitening phenomenon that occurs in side view. Moreover, while ensuring the removal of the whitening phenomenon, the pixel structure can be ensured to have a high transmittance, thereby making the display more uniform and improving the display effect.

Preferably, the first angle is 42 degrees.

When the acute intersecting angle between the first branch electrode and the first main electrode in the first pixel structure is 42 degrees, and the acute intersecting angle between the second branch electrode and the second main electrode in the second pixel structure is 45 degrees, the effect of removing the whitening phenomenon in the side view is best, and the pixel structure can be ensured to have a high transmittance.

The first main electrode 5011 in the embodiment is strip-shaped, and the two sides of the first main electrode 5011 are the first branch electrode 5012, and each of the first branch electrodes 5012 is also strip-shaped, and is connected to the first main electrode 5011. A slit is formed between the gaps between each adjacent two first branch electrodes 5012 and extends to an edge position of the first pixel structure 501, which is generally referred to as an alignment slit.

Figure 13:
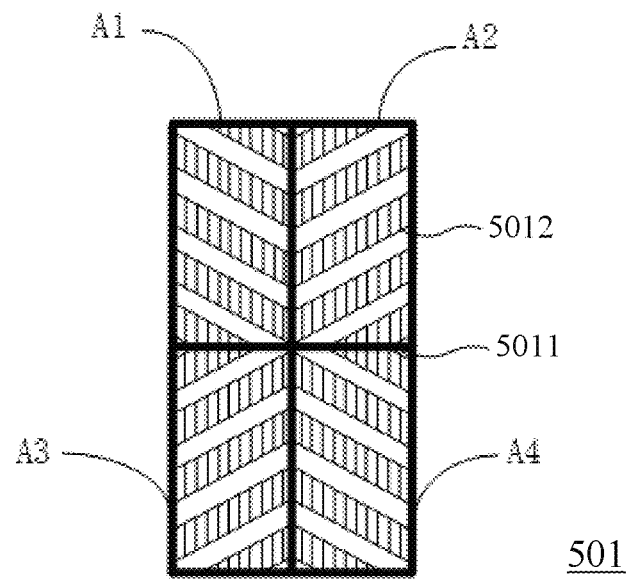
FIG. 13 is a schematic structural diagram of a first pixel according to an embodiment of the invention.

In a specific embodiment, see FIG. 13, the first main electrode 5011 is a cross-shaped electrode, and the first main electrode 5011 divides the first pixel structure 501 into four first domains, and adjacent two first branch electrodes 5012 in any one of the first domains are parallel to each other.

In a specific embodiment, the angle between the first branch electrode 5012 and the horizontal direction of the first main electrode 5011 is a first angle.

In a specific embodiment, referring to FIG. 13, the first main electrode 5011 is a cross-shaped electrode, and the cross-shaped electrode divides the first pixel structure 501 into four first domains, namely, A1, A2, A3, and A4, wherein the A1 domain is adjacent to the A2 domain and the A3 domain. In the above four first domains, the first branch electrode 5012 in each of the first domains is connected to the first main electrode 5011 to interconnect the electrodes. For any one of the four first domains, all of the first branch electrodes 5012 in each first domain have the same tilt direction, that is, the adjacent two first branch electrodes 5012 in any one of the first domains are parallel to each other.

Taking the A1 domain as an example, the relative position of the A1 domain is located at the upper left of the first pixel structure 501, and the tilt direction of the first branch electrode 5012 within the domain is also inclined toward the upper left direction.

Preferably, the first branch electrodes 5012 of the adjacent two first domains are not parallel to each other.

Taking the A2 domain as an example, the A2 domain relative position is located at the upper right of the first pixel structure 501, and the tilt direction of the first branch electrode 5012 in the domain is also inclined toward the upper right direction. Taking the A3 domain as an example, the A3 domain relative position is located at the lower left of the first pixel structure 501, and the tilt direction of the first branch electrode 5012 in the domain is also inclined toward the lower left direction. Taking the A4 domain as an example, the A4 domain relative position is located at the lower right of the first pixel structure 501, and the tilt direction of the first branch electrode 5012 in the domain is also inclined toward the lower right direction. That is, the orientation of any one of the first branch electrodes 5012 in the A1 domain and the first branch electrode 5012 in the A2 domain is different. That is, the first branch electrode 5012 in the A1 domain is not parallel to the first branch electrode 5012 in the A2 domain. Similarly, the first branch electrode 5012 in the A1 domain is not parallel to the first branch electrode 5012 in the A3 domain. The orientation of the above electrodes can be set to improve the display color shift after voltage application.

In this embodiment, the second main electrode 5021 is strip-shaped, two sides of the second main electrode 5021 are second branch electrodes 5022, and each second branch electrode 5022 is also strip-shaped, and is connected to the second main electrode 5021. A slit is formed between the gaps between each adjacent two second branch electrodes 5022 and extends to an edge position of the second pixel structure 502, which is generally referred to as an alignment slit.

Figure 14:
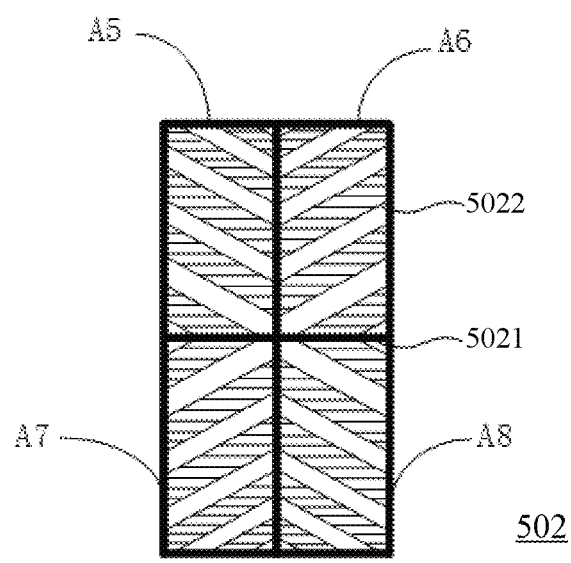
FIG. 14 is a schematic structural diagram of a second pixel according to an embodiment of the invention.

In a specific embodiment, see FIG. 14, the second main electrode 5021 is a cross-shaped electrode, the second main electrode 5021 divides the second pixel structure 502 into four second domains, and adjacent two second branch electrodes 5022 of any one of the second domains are parallel to each other.

In a specific embodiment, the angle between the second branch electrode 5022 and the second main electrode 5021 in the horizontal direction is a second angle.

In a specific embodiment, see FIG. 14, the second main electrode 5021 is a cross-shaped electrode, and the cross-shaped electrode divides the second pixel structure 502 into four second domains, namely, A5, A6, A7, and A8, wherein the A5 domain is adjacent to the A6 domain and the A7 domain. In the above four second domains, the second branch electrode 5022 in each of the second domains is connected to the second main electrode 5021 to interconnect the electrodes. For any one of the four second domains, the inclination directions of all the second branch electrodes 5022 in each second domain are the same, that is, the adjacent two second branch electrodes 5022 in any one of the second domains are parallel to each other.

Taking the A5 domain as an example, the A5 domain relative position is located at the upper left of the second pixel structure 502, and the tilt direction of the second branch electrode 5022 within the domain is also inclined toward the upper left direction.

Preferably, the second branch electrodes 5022 of the adjacent two second domains are not parallel to each other.

Taking the A6 domain as an example, the relative position of the A6 domain is located at the upper right of the second pixel structure 502, and the tilt direction of the second branch electrode 5022 within the domain is also inclined toward the upper right direction. Taking the A7 domain as an example, the relative position of the A7 domain is located at the lower left of the second pixel structure 502, and the tilt direction of the second branch electrode 5022 within the domain is also inclined toward the lower left direction. Taking the A8 domain as an example, the A8 domain relative position is located at the lower right of the second pixel structure 502, and the tilt direction of the second branch electrode 5022 within the domain is also inclined toward the lower right direction. That is, the orientation of any one of the second branch electrodes 5022 in the A5 domain and the second branch electrode 5022 of the A6 domain is different. That is, the second branch electrode 5022 in the A5 domain is not parallel to the second branch electrode 5022 in the A7 domain. Similarly, the second branch electrode 5022 in the A5 domain is not parallel to the second branch electrode 5022 in the A7 domain. The orientation of the above electrodes can be set to improve the display color shift after voltage application.

Figure 15:
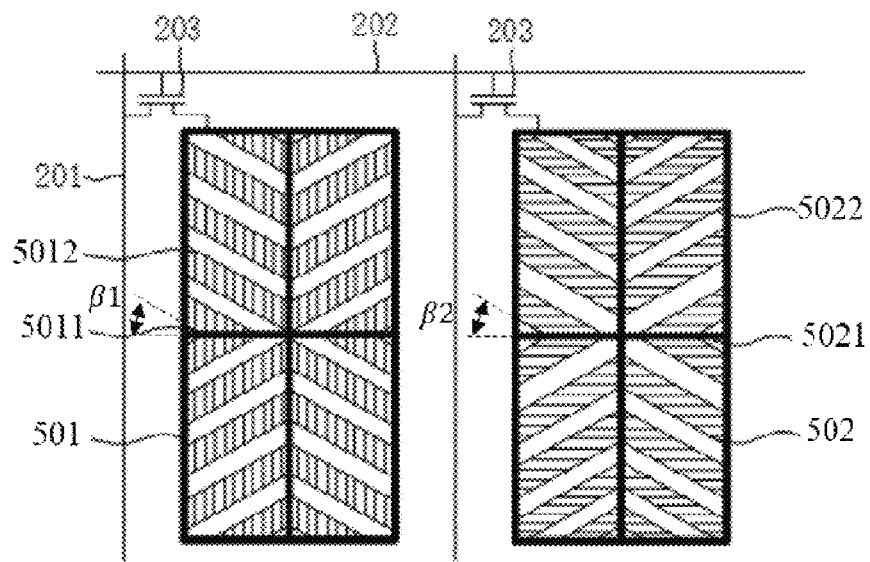
FIG. 15 is a schematic structural diagram of another pixel unit according to an embodiment of the invention.

Referring to FIG. 15, FIG. 15 is a schematic structural diagram of another pixel unit according to an embodiment of the invention. The pixel unit of the embodiment of the invention further includes:

a data line 201, a scan line 202; and switching devices 203 electrically connecting the data line 201 and the scan line 202, and electrically connecting the first pixel structure and the second pixel structure, respectively.

In this embodiment, please refer to FIG. 15 again. The data line 201 is disposed perpendicular to the scan line 202. It should be noted that, in this embodiment, the data line 201 and the scan line 202 carry a first pixel structure 501 or a second pixel structure 502 as an example. In an actual display panel, one scan line 202 and one data line 201 correspond to a plurality of first pixel structures 501 or second pixel structures 502 connected thereto. The data line 201 is used to load the data driving signal onto the first pixel structure 501 or the second pixel structure 502. The data driving signal controls the first pixel structure 501 or the second pixel structure 502 to display colors of different gray scales according to the magnitude of the driving voltage. The scan line 202 is used to load a scan driving signal to the first pixel structure 501 or the second pixel structure 502, and the scan driving signal controls whether the data driving signal is loaded onto the first pixel structure 501 or the second pixel structure 502. In a specific embodiment, the data line 201 and the scan line 202 are generally made of a conductive material, and may specifically be a metal element, an alloy, a metal oxide, a metal nitride, a metal oxynitride or a combination of two or more of the above materials.

For the sake of better explanation, in the present embodiment, the switching device 203 is exemplified as a TFT (Thin Film Transistor). Of course, the switching device 203 is not limited to this device as long as the function can be realized. Specifically, the TFT includes a source, a drain, and a gate, wherein the source is connected to the data line 201, the gate is connected to the scan line 202, and the drain is connected to the first pixel structure 501 or the second pixel structure 502. In operation, the scan driving circuit generates a scan driving signal, which is transmitted to the gate of the TFT through the scan line, thereby controlling the gate to be turned on. At this time, the data driving signal generated by the data driving circuit is transmitted to the source of the TFT through the scan line. At this time, since the TFT gate is turned on, the data driving signal of the source is input to the first pixel structure 501 or the second pixel structure 502 to complete one driving.

In a specific embodiment, one pixel unit includes an X row and Y column pixel structure (0<M≤X, 0<N≤Y). For more convenient description, each pixel structure is marked with the sub pixels of the N-th row and the M-th column as $A_{N,M}$, for example, the pixel structure of the first row and the first column is $A_{1,1}$.

In a specific embodiment, arranging the first pixel structure and the second pixel structure alternately according to the first interval setting along the data line direction, arranging the first pixel structure and the second pixel structure alternately according to the second interval setting in the scan line direction.

In a specific embodiment, in the direction of the data line, when the first interval setting is every other pixel structure, the pixel structure $A_{1,N}$ is the first pixel structure, the pixel structure $A_{2,N}$ is the second pixel structure, the pixel structure $A_{3,N}$ is the first pixel structure, the pixel structure $A_{4,N}$ is the second pixel structure, and so on. In the direction of the data line, every other pixel structure is alternately arranged with the first pixel structure and the second pixel structure; meanwhile, in the direction of the scan line, when the second interval setting is every other pixel structure, the pixel structure $A_{M,1}$ is a first pixel structure, and the pixel structure $A_{M,2}$ is a second pixel structure, the pixel structure $A_{M,3}$ is the first pixel structure, the pixel structure $A_{M,4}$ is the second pixel structure, and so on. In the direction of the scan line, every other pixel structure is alternately arranged in a first pixel structure and a second pixel structure.

For example, please see FIG. 12 again, in the direction of the data line, when the first interval setting is every other pixel structure, the pixel structure $A_{1,1}$ is a second pixel structure, the pixel structure $A_{2,1}$ is a first pixel structure, the pixel structure is $A_{3,1}$ is a second pixel structure, the pixel structure $A_{4,1}$ is a first pixel structure, and so on, in the direction of the data line, every other pixel structure is alternately arranged with the first pixel structure and the second pixel structure; meanwhile, in the direction of the scan line, when the second interval setting is every other pixel structure, the pixel structure $A_{1,1}$ is a second pixel structure, the pixel structure $A_{1,2}$ is a first pixel structure, the pixel structure $A_{1,3}$ is a second pixel structure, the pixel structure $A_{1,4}$ is a first pixel structure, the pixel structure $A_{1,5}$ is a second pixel structure, the pixel structure $A_{1,6}$ is a first pixel structure, and so on, in the direction of the scan line, every other pixel structure is alternately arranged in a first pixel structure and a second pixel structure.

The first pixel structure and the second pixel structure in the pixel unit of the embodiment are arranged in an alternate manner. The whitening phenomenon can be further removed in the side view, and at the same time, the pixel unit can be ensured to have a higher transmittance, thereby making the display more uniform and further improving the display effect.

In this embodiment, the first interval setting and the second interval setting are set according to actual needs, which is not specifically limited in this embodiment.

In a specific embodiment, the adjacent two columns of pixel structures have opposite polarities, that is, a polarity column inversion manner. For example, when the polarity of the pixel structure of the i-th column is +−+−+−, the polarity of the pixel structure corresponding to the (i+1)-th column is −+−+−+.

In a specific embodiment, based on the first pixel structure and the second pixel structure arrangement in the pixel unit, a voltage is applied to the pixel structure in a first driving method or a second driving method.

Further, the first driving method includes a first sub driving method and a second sub driving method, in a frame, voltages are applied to the pixel structure alternately in the first sub driving method or the second sub driving method along the scan line direction according to the first predetermined interval.

In a specific embodiment, the data line D1 is connected to the pixel structure $A_{M,1}$, and the corresponding voltage is the first driving voltage, the data line D2 is connected to the pixel structure $A_{M,2}$, and the corresponding voltage is the second driving voltage, the data line DN is connected to the pixel structure $A_{M,N}$, and from the pixel structure $A_{M,2}$ to the pixel structure $A_{M,Y-1}$, and is alternately loaded with the first driving voltage or the second driving voltage to the corresponding pixel structure every third interval setting, the data line DY is connected to the pixel structure $A_{M,Y}$, and the corresponding voltage is the first driving voltage, and the method is the first sub driving method. At the same time, the data line D1 is connected to the pixel structure $A_{M+1,1}$, and the corresponding voltage is the second driving voltage, the data line D2 is connected to the pixel structure $A_{M+1,2}$, and its corresponding voltage is the first driving voltage, and from the pixel structure $A_{M+1,2}$ to the pixel structure $A_{M+1,Y-1}$, and is alternately loaded with the first driving voltage or the second driving voltage to the corresponding pixel structure every third interval setting, and the data line DY is connected to the pixel structure $A_{M+1,Y}$, and the corresponding voltage is the second driving voltage, which is the second sub driving method. For example, the data line D1 is connected to the pixel structure $A_{1,1}$, and the corresponding voltage is the first driving voltage, the data line D2 is connected to the pixel structure $A_{1,2}$, and its corresponding voltage is the second driving voltage, the data line DN is connected to the pixel structure $A_{1,N}$, and from the pixel structure $A_{1,2}$ to the pixel structure $A_{1,Y-1}$, and is alternately loaded with the first driving voltage or the second driving voltage to the corresponding pixel structure every third interval setting, and the data line DY is connected to the pixel structure $A_{1,Y}$, and the corresponding voltage is the first driving voltage, and the method is the first sub driving method. At the same time, when a voltage is applied to the pixel structure corresponding to the scan line G1 in the first sub driving method, a voltage is applied to the pixel structure corresponding to the scan line G2 in the second sub driving method described below; the data line D1 is connected to the pixel structure $A_{2,1}$, and the corresponding voltage is the second driving voltage, the data line D2 is connected to the pixel structure $A_{2,2}$, and its corresponding voltage is the first driving voltage, and from the pixel structure $A_{2,2}$ to the pixel structure $A_{2,Y-1}$, and is alternately loaded with the first driving voltage or the second driving voltage to the corresponding pixel structure every third interval setting, and the data line DY is connected to the pixel structure $A_{2,Y}$, and the corresponding voltage is the first driving voltage, which is the second sub driving method. And so on, in the direction of the scan line, alternately load the voltage to the pixel structure in the first sub driving method or the second sub driving method. In this embodiment, the first predetermined interval is every other pixel structure in the direction of the scan line, and the adjacent scan lines alternately load the first sub driving method and the second sub driving method.

In this embodiment, the first predetermined interval is every other pixel structure in the direction of the scan line, that is, the adjacent scan lines alternately load the third sub driving method and the fourth sub driving method.

In this embodiment, the first predetermined interval and the third interval setting are set according to actual needs, which is not specifically limited in this embodiment.

In this embodiment, the first sub driving method and the second sub driving method are sufficient to apply a voltage to the pixel structure in an alternating manner.

For example, please see FIG. 6, again. taking 8×12 as an example, the pixel structure includes 8 rows and 12 columns, arranged along the data line direction, according to the first interval setting, alternately arranged by the first pixel structure and the second pixel structure, arranging the first pixel structure and the second pixel structure alternately according to the second interval setting along the scan line direction, wherein, the first interval setting and the second interval setting are every other pixel structure, and the third interval setting is every two pixel structures in the data line direction, the first predetermined interval is every other pixel structure in the direction of the scan line, and the pixel structure $A_{1,1}$ is the second pixel structure.

The data line D1 is connected to the pixel structure $A_{1,1}$, and the voltage corresponding to the pixel structure $A_{1,1}$ is the first driving voltage, the data line D2 and the data line D3 are connected to the pixel structure $A_{1,2}$ and the pixel structure $A_{1,3}$, respectively, and the voltages corresponding to the pixel structure $A_{1,2}$ and the pixel structure $A_{1,3}$ are the second driving voltage, the data line D4 and the data line D5 are respectively connected to the pixel structure $A_{1,4}$ and the pixel structure $A_{1,5}$, and the voltages corresponding to the pixel structure $A_{1,4}$ and the pixel structure $A_{1,5}$ are the first driving voltage, and so on. The data line D10 and the data line D11 are connected to the pixel structure $A_{1,10}$ and the pixel structure $A_{1,11}$, respectively, and the voltages corresponding to the pixel structure $A_{1,10}$ and the pixel structure $A_{1,11}$ are the second driving voltage, the data line D12 is connected to the pixel structure $A_{1,12}$, and the voltage corresponding to the pixel structure $A_{1,12}$ is the first driving voltage; at the same time, the data line D1 is connected to the pixel structure $A_{2,1}$, and the voltage corresponding to the pixel structure $A_{2,1}$ is the second driving voltage, the data line D2 and the data line D3 are connected to the pixel structure $A_{2,2}$ and the pixel structure $A_{2,3}$, respectively, and the voltages corresponding to the pixel structure $A_{2,2}$ and the pixel structure $A_{2,3}$ are the first driving voltage, the data line D4 and the data line D5 are respectively connected to the pixel structure $A_{2,4}$ and the pixel structure $A_{2,5}$, and the voltages corresponding to the pixel structure $A_{2,4}$ and the pixel structure $A_{2,5}$ are the second driving voltage, and so on. The data line D10 and the data line D11 are connected to the pixel structure $A_{2,10}$ and the pixel structure $A_{2,11}$, respectively, and the voltages corresponding to the pixel structure $A_{2,10}$ and the pixel structure $A_{2,11}$ are the first driving voltage, the data line D12 is connected to the pixel structure $A_{2,12}$, and the voltage corresponding to the pixel structure $A_{2,12}$ is the second driving voltage, and so on. In the direction of the scan line, the voltage is applied to the pixel structure alternately in the first sub driving method or the second sub driving method.

In an embodiment, in the direction of the scan line, the voltage is applied to the pixel structure in the first sub driving method or the second sub driving method alternately according to the third predetermined interval. At the same time, the pixel unit utilizes the polarity column inversion method, thereby further improving the whitening phenomenon while maintaining a high transmittance.

On the basis of the pixel unit obtained in the embodiment, the pixel structure of the pixel unit is loaded with a voltage in the first driving method, and the pixel unit is reversed by the polarity column, so that the whitening phenomenon can be further improved. At the same time, it can maintain a high transmittance, making the display uniform and improving the display effect.

Further, the second driving method includes a third sub driving method and a fourth sub driving method, a voltage is applied to the pixel structure in a third sub driving method or a fourth sub driving method alternately along the scan line direction at a second predetermined interval.

In a specific embodiment, in the scan line direction, from the pixel structure $A_{M1}$ to the pixel structure $A_{MY}$, every fourth interval setting, the first driving voltage or the second driving voltage is alternately loaded onto the corresponding pixel structure. For example, when the fourth interval setting is every two pixel structures, the data line D1 and the data line D2 are respectively connected to the pixel structure $A_{M,1}$ and the pixel structure $A_{M,2}$, the voltage corresponding to the pixel structure $A_{M,1}$ and the pixel structure $A_{M,2}$ is the first driving voltage, the data line D3 and the data line D4 are respectively connected to the pixel structure $A_{M,3}$ and the pixel structure $A_{M,4}$, the pixel structure $A_{M,3}$ and the pixel structure $A_{M,4}$ are voltages of the second driving voltage, the data line D5 and the data line D6 are respectively connected to the pixel structure $A_{M,5}$ and the pixel structure $A_{M,6}$, the pixel structure $A_{M,5}$ and the pixel structure $A_{M,6}$ are voltages of the first driving voltage, and so on. This method is the third sub driving method. At the same time, the data line D1 and the data line D2 are respectively connected to the pixel structure $A_{M+1,1}$ and the pixel structure $A_{M+1,2}$, the voltage corresponding to the pixel structure $A_{M+1,1}$ and the pixel structure $A_{M+1,2}$ is the second driving voltage. The data line D3 and the data line D4 are connected to the pixel structure $A_{M+1,3}$ and the pixel structure $A_{M+1,4}$, respectively. The voltage corresponding to the pixel structure $A_{M+1,3}$ and the pixel structure $A_{M+1,4}$ is the first driving voltage. The data line D5 and the data line D6 are connected to the pixel structure $A_{M+1,5}$ and the pixel structure $A_{M+1,6}$, respectively. The voltage corresponding to the pixel structure $A_{M+1,5}$ and the pixel structure $A_{M+1,6}$ is the second driving voltage, and so on, which is the fourth sub driving method. In the direction of the scan line, voltages are alternately applied to the pixel structure in a third sub driving method or a fourth sub driving method. For example, the data line D1 and the data line D2 are respectively connected to the pixel structure $A_{11}$ and the pixel structure $A_{12}$, and the voltages of the pixel structure $A_{11}$ and the pixel structure $A_{12}$ are both the first driving voltage. The data line D3 and the data line D4 are connected to the pixel structure $A_{1,3}$ and the pixel structure $A_{1,4}$, respectively, and the voltages of the pixel structure $A_{1,3}$ and the pixel structure $A_{1,4}$ are the second driving voltage. The data line D5 and the data line D6 are connected to the pixel structure $A_{1,5}$ and the pixel structure $A_{1,6}$, respectively, and the voltages of the pixel structure $A_{1,5}$ and the pixel structure $A_{1,6}$ are the first driving voltage, and so on. This method is the third sub driving method. At the same time, when a voltage is applied to the pixel structure corresponding to the scan line G1 in the third sub driving method, a voltage is applied to the pixel structure corresponding to the scan line G2 in the fourth sub driving method described below; the data line D1 and the data line D2 are respectively connected to the pixel structure $A_{2,1}$ and the pixel structure $A_{2,2}$, and the voltages of the pixel structure $A_{2,1}$ and the pixel structure $A_{2,2}$ are the second driving voltage. The data line D3 and the data line D4 are respectively connected to the pixel structure $A_{2,3}$ and the pixel structure $A_{2,4}$, the pixel structure $A_{2,3}$ and the pixel structure $A_{2,4}$ are the first driving voltage. The data line D5 and the data line D6 are respectively connected to the pixel structure $A_{2,5}$ and the pixel structure $A_{2,6}$, the pixel structure $A_{2,5}$ and the pixel structure $A_{2,6}$ are the first driving voltage, and so on. This method is the fourth sub driving method. Similarly, in the direction of the scan line, the voltage is applied to the pixel structure alternately in the third sub driving method or the fourth sub driving method. In the second predetermined driving interval in the embodiment, that is, every other pixel structure in the scan line direction, that is, the adjacent scan lines alternately load the third sub driving method and the fourth sub driving method.

In this embodiment, the second predetermined interval is every other pixel structure in the direction of the scan line, that is, the adjacent scan lines alternately load the third sub driving method and the fourth sub driving method.

In this embodiment, the second predetermined interval and the fourth interval setting are set according to actual needs, which is not specifically limited in this embodiment.

In this embodiment, the third sub driving method and the fourth sub driving method are sufficient to apply a voltage to the pixel structure in an alternating manner.

For example, please refer to FIG. 7 again, taking 8×12 as an example, that is, the pixel structure includes 8 rows and 12 columns. In the direction of the data line, according to the first interval setting, the first pixel structure and the second pixel structure are alternately arranged, arranging the first pixel structure and the second pixel structure alternately according to the second interval setting along the scan line direction, wherein the first interval setting and the second interval setting are every other pixel structure, and the fourth interval setting is every two pixel structures in the data line direction, the second predetermined interval is every other pixel structure in the direction of the scan line, and the pixel structure $A_{1,1}$ is the second pixel structure.

The data line D1 and the data line D2 are respectively connected to the pixel structure $A_{1,1}$ and the pixel structure $A_{1,2}$, and the voltage corresponding to the pixel structure $A_{1,1}$ and the pixel structure $A_{1,2}$ is the first driving voltage. The data line D3 and the data line D4 are respectively connected to the pixel structure $A_{1,3}$ and the pixel structure $A_{1,4}$, and the voltages corresponding to the pixel structure $A_{1,3}$ and the pixel structure $A_{1,4}$ are the second driving voltage. The data line D5 and the data line D6 are respectively connected to the pixel structure $A_{1,5}$ and the pixel structure $A_{1,6}$, the pixel structure $A_{1,5}$ and the pixel structure $A_{1,6}$ corresponding to the voltage is the first driving voltage, and so on, the data line D11 and the data line D12 are respectively connected to the pixel structure $A_{1,11}$ and the pixel structure $A_{1,12}$, and the voltages corresponding to the pixel structure $A_{1,11}$ and the pixel structure $A_{1,12}$ are all the second driving voltage, the data line D1 and the data line D2 are respectively connected to the pixel structure $A_{2,1}$ and the pixel structure $A_{2,2}$, and the voltage corresponding to the pixel structure $A_{1,1}$ and the pixel structure $A_{1,2}$ is the second driving voltage, the data line D3 and the data line D4 are respectively connected to the pixel structure $A_{2,3}$ and the pixel structure $A_{2,4}$, the pixel structure $A_{2,3}$ and the pixel structure $A_{2,4}$ corresponding to the voltage are the first driving voltage, the data line D5 and the data line D6 are respectively connected to the pixel structure $A_{2,5}$ and the pixel structure $A_{2,6}$, the pixel structure $A_{2,5}$ and the pixel structure $A_{2,6}$ corresponding to the voltage is the second driving voltage, and so on, the data line D11 and the data line D12 are respectively connected to the pixel structure $A_{2,11}$ and the pixel structure $A_{2,12}$, and the voltages corresponding to the pixel structure $A_{2,11}$ and the pixel structure $A_{2,12}$ are the first driving voltage, and so on, in the direction of the scan line, the voltage is applied to the pixel structure alternately in the first sub driving method or the second sub driving method.

In an embodiment, in the direction of the scan line, the voltage is applied to the pixel structure in a third sub driving method or a fourth sub driving method alternately according to the second predetermined interval. At the same time, the pixel unit utilizes the polarity column inversion method, thereby further improving the whitening phenomenon while maintaining a high transmittance.

On the basis of the pixel unit obtained in the embodiment, the pixel structure of the pixel unit is loaded with a voltage in the second driving method, and the pixel unit is reversed by the polarity column, so that the whitening phenomenon can be further improved. At the same time, it can maintain a high transmittance, making the display uniform and improving the display effect.

In this embodiment, forming the first gray scale data and the second gray scale data according to the original pixel data, and differentiating the pixel gray scale of the first gray scale data from the second gray scale data, generating the first driving voltage according to the first gray scale data, and generating a second driving voltage according to the second gray scale data; and in a frame, the first driving voltage or the second driving voltage is loaded to the pixel structure along the data line direction. In this way, it is possible to prevent the voltage applied to the pixel structure from being affected by the polarity inversion, thereby avoiding the occurrence of crosstalk and bright and dark lines.

In a specific example, the first gray scale data is considered to be high gray scale data, and the second gray scale data is considered to be low gray scale data, correspondingly, the magnitude of the voltage input to the pixel structure is determined by the gray scale, and the high gray scale voltage corresponding to the high gray scale data is generated, that is, the first driving voltage; a low gray scale voltage corresponding to the low gray scale data, that is, a second driving voltage, it is worth mentioning that the above-mentioned high gray scale and low gray scale represent the relative values of the gray scale sizes of the two groups, and the magnitude of the values is not individually limited.

Based on the pixel unit obtained in this embodiment, the voltage is applied to different pixel structures of the pixel unit by the first driving voltage and the second driving voltage, and the pixel unit uses the polarity column inversion mode, thereby further improving the whitening phenomenon. At the same time, it can maintain a high transmittance, making the display uniform and improving the display effect.

In addition, an embodiment of the invention further provides a display panel (please refer to FIG. 8 again), including:

a first substrate 11;

a second substrate 12 located opposite to the first substrate 11;

a pixel unit 14 disposed between the first substrate and the second substrate. for the structure, refer to the detailed description of the pixel unit in the fifth embodiment; and a liquid crystal material 13 located between the first substrate and the second substrate.

The material of the first substrate and the second substrate may be a semiconductor material such as glass or quartz, or may be an organic polymer or the like, and the material of the first substrate may be the same as or different from the material of the second substrate. The liquid crystal material 13 is mainly composed of liquid crystal molecules, and the liquid crystal molecules are correspondingly disposed between adjacent two branch electrodes in each pixel unit, so that after the voltage is applied, the liquid crystal molecules reach a better alignment, thereby improving the light transmittance, thereby improving the display effect.

The pixel unit and the display panel of the embodiment of the invention can achieve the dual purpose of improving the whitening phenomenon of the viewing angle without changing the process conditions, and can also maintain a high transmittance.

Referring to FIG. 9 again, in the embodiment, the abscissa corresponds to a gray scale, and the ordinate corresponds to a luminance normalized value. 45 degrees, Azimuth0 represents the display panel with an angle of 45 degrees between the branch electrode and the main electrode in the existing design, and the viewing angle is positive. 45 degrees, Azimuth60 represents the display panel with an angle of 45 degrees between the branch electrode and the main electrode in the existing design, and the viewing angle is 60 degrees from the angle of the display panel. 42+45 degrees, Azimuth0 is a display panel provided by an embodiment of the invention, 42+45 degrees, Azimuth0 represents a display panel in which the first branch electrode of the first pixel structure and the first main electrode are at an angle of 42 degrees, and the second branch electrode of the second pixel structure and the second main electrode are at an angle of 45 degrees, the viewing angle is positive, 42+45 degrees, Azimuth 60 is a display panel provided by an embodiment of the invention, and the viewing angle is 60 degrees with the display panel. The display panel proposed by the embodiment of the invention, when viewed at a viewing angle of 60 degrees, is under 128 gray scales, the transmittance is 4.4% lower than that of the conventional design in which the angle between the branch electrode and the main electrode of the current display panel is 45 degrees, and the gamma curve is closer to the curve of the gamma 2.2; in the front view direction, the transmittance of the pixel structure of the display panel proposed by the embodiment of the invention is only 0.38% lower than the transmittance of the pixel structure of the currently designed display panel, and the decrease is small. Therefore, it is possible to effectively improve the whitening phenomenon of the viewing angle while maintaining a high transmittance.

Embodiment 6

Figure 16:
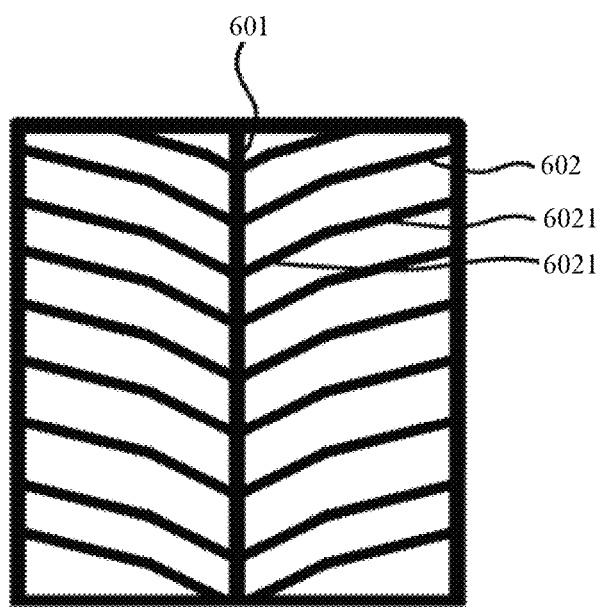
FIG. 16 is a schematic structural diagram of a pixel according to an embodiment of the invention.

Referring to FIG. 16, FIG. 16 is a schematic structural diagram of a pixel according to an embodiment of the invention. The pixel structure of this embodiment includes:

a main electrode 601;

a plurality of branch electrodes 602 connected to the main electrode 601;

wherein each of the branch electrodes 602 includes N sub-branch electrodes 6021 connected in sequence.

In a specific embodiment, an acute intersecting angle between the sub-branch electrode and the main electrode is greater than or equal to a first angle and less than or equal to a second angle, wherein N>1 and is a positive integer.

In a specific embodiment, the first angle is greater than or equal to 40 degrees and less than 45 degrees, and the second angle is equal to 45 degrees.

Preferably, the first angle is 42 degrees.

In a specific embodiment, the angle between the sub-branch electrode and the horizontal direction of the main electrode is greater than or equal to the first angle and less than or equal to the second angle.

In a specific embodiment, each of the branch electrodes has a set number of sub-branch electrodes having the same acute intersecting angle as the main electrode. The set quantity group includes a plurality of set numbers, and the set quantity group is greater than or equal to 0 and less than N, and N>1.

Specifically, when the number of the set number group is one, and the set number is equal to 2, it represents that each branch electrode has the same angle of the acute intersecting angle of the two sub-branch electrodes and the main electrode; when the number of set number groups is two, one of the set numbers is equal to 3, and the other set number is equal to 2, which means that each branch electrode has three sub-branch electrodes having the same acute intersecting angle as the main electrode, for example, it is 45°, and the branch electrode also has the same angle of the acute intersecting angle of the other two sub-branch electrodes and the main electrode, for example, 42°.

Figure 17:
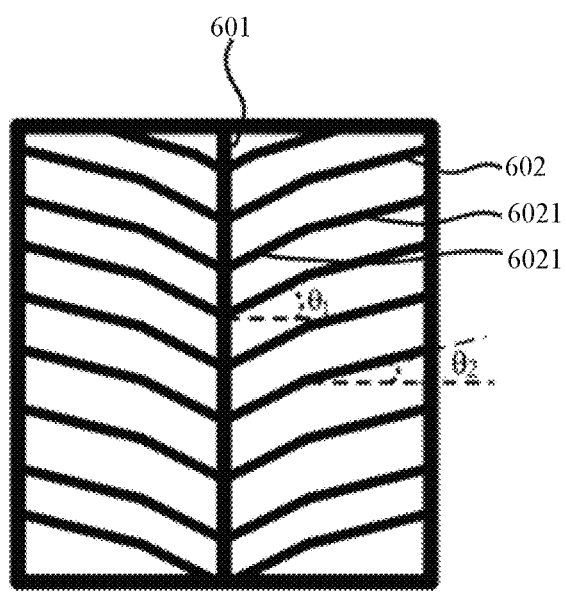
FIG. 17 is a schematic structural diagram of another pixel according to an embodiment of the invention.

For example, referring to FIG. 17, the branch electrode 602 is composed of two sub-branch electrodes 6021. The acute intersecting angle between one of the sub-branch electrodes 6021 and the main electrode 601 is θ1, and θ1=45°, and the acute intersecting angle between the other sub-branch electrode 6021 and the main electrode 601 is θ2, and θ2=42°.

For another example, the branch electrode 602 is composed of six sub-branch electrodes 6021, which are a first sub-branch electrode, a second sub-branch electrode, a third sub-branch electrode, a fourth sub-branch electrode, a fifth sub-branch electrode, and a sixth sub-branch electrode, respectively. The first sub-branch electrode, the second sub-branch electrode, the third sub-branch electrode, the fourth sub-branch electrode, the fifth sub-branch electrode, and the sixth sub-branch electrode are sequentially connected. The first sub-branch electrode and the sixth sub-branch electrode are also connected to the main electrode 601, respectively. In one embodiment, the number of set number groups is one, and the set number is equal to two, that is, the acute intersecting angle between the first sub-branch electrode and the third sub-branch electrode and the main electrode 601 is the same, both are 45°, the acute intersecting angle between the second sub-branch electrode and the main electrode 601 is 44°, the acute intersecting angle between the fourth sub-branch electrode and the main electrode 601 is 43°, the acute intersecting angle between the fifth sub-branch electrode and the main electrode 601 is 42°, the acute intersecting angle between the sixth sub-branch electrode and the main electrode 601 is 41°. In another embodiment, the number of set quantity groups is two, one of which is equal to 3 and the other is equal to 2, that is, the acute intersecting angle between the first sub-branch electrode, the third sub-branch electrode, and the fifth sub-branch electrode and the main electrode 601 is the same, both being 45°. The acute intersecting angle between the second sub-branch electrode and the fourth sub-branch electrode and the main electrode 601 is the same, both being 42°, and the acute intersecting angle between the sixth sub-branch electrode and the main electrode 601 is 41°.

When the acute intersecting angle between the partial of the sub-branch electrodes and the main electrode in a pixel structure is at a first angle, and at the same time, an acute intersecting angle between the other sub-branch electrodes and the main electrode is a second angle, the whitening phenomenon occurring in the side view is solved. Moreover, while ensuring the removal of the whitish phenomenon, the pixel structure can be ensured to have a high transmittance, thereby making the display more uniform and improving the display effect.

The main electrode 601 in the embodiment is strip-shaped, and the two sides of the main electrode 601 are branch electrodes 602, and each branch electrode 602 is also strip-shaped, and is connected to the main electrode 601. A slit is formed between the gaps between each adjacent two branch electrodes 602 and extends to an edge position of the pixel structure, which is generally referred to as an alignment slit.

In a specific embodiment, the main electrode is a cross-shaped electrode, the main electrode divides the pixel structure into four domains, and adjacent two branch electrodes in any one of the domains are parallel to each other.

In a specific embodiment, the adjacent two domains are symmetrical along the cross-shaped electrode.

Figure 18:
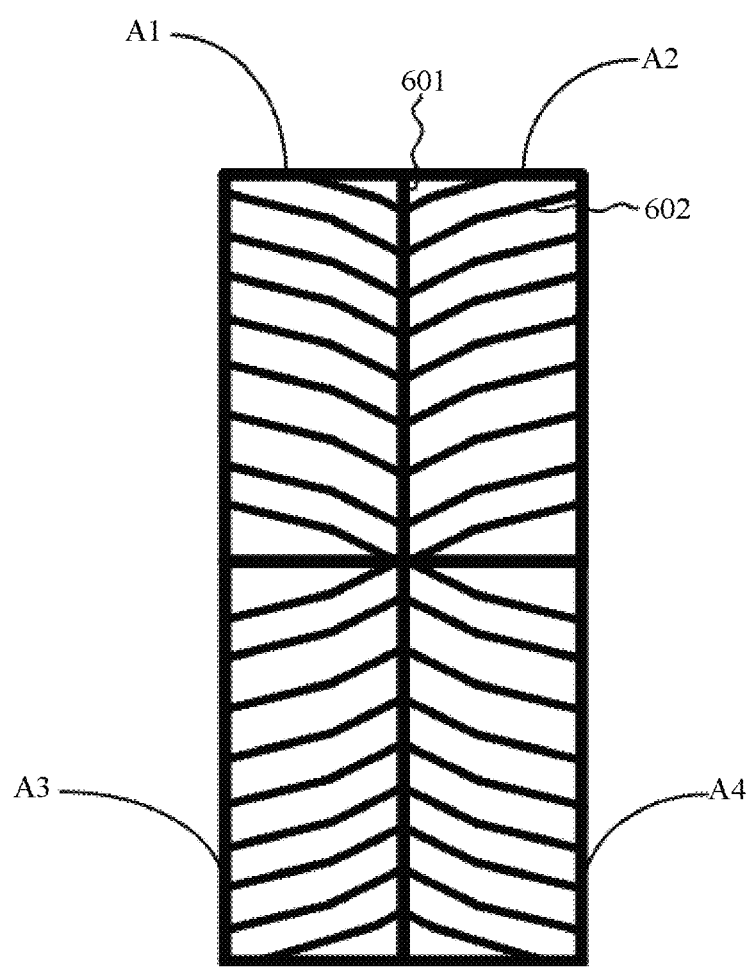
FIG. 18 is a schematic diagram of still another pixel structure according to an embodiment of the invention.

In a specific embodiment, see FIG. 18, the main electrode is a cross-shaped electrode, and the cross-shaped electrode divides the pixel structure into four domains, namely, A1, A2, A3, and A4, wherein the A1 domain is adjacent to the A2 domain and the A3 domain, and the A4 domain is adjacent to the A2 domain and the A3 domain. In the above four domains, the branch electrodes in each of the domains are connected to the main electrode 601 to interconnect the electrodes. And the A1 domain and the A2 domain are symmetric along the longitudinal axis of the cross-shaped electrode, and the A1 domain and the A3 domain are symmetric along the horizontal axis of the cross-shaped electrode. The A4 domain and the A2 domain are symmetric along the horizontal axis of the cross-shaped electrode, and the A4 domain and the A3 domain are symmetric along the longitudinal axis of the cross-shaped electrode. The symmetry of the adjacent two domains along the cross-shaped electrode can further improve the whitening phenomenon which occurs in side view, and can further improve the transmittance of the pixel structure.

In a specific embodiment, referring again to FIG. 18, for one of the four domains, the inclination directions of all the branch electrodes in each domain are the same, that is, the adjacent two branch electrodes in any one of the domains are parallel to each other.

Taking the A1 domain as an example, the relative position of the A1 domain is located at the upper left of the pixel structure, and the tilt direction of the branch electrodes in the domain is also inclined toward the upper left direction.

Preferably, the branch electrodes in the adjacent two domains are not parallel to each other.

That is, taking the A2 domain as an example, the relative position of the A2 domain is located at the upper right of the pixel structure, and the tilt direction of the branch electrode in the domain is also inclined toward the upper right direction. Taking the A3 domain as an example, the relative position of the A3 domain is located at the lower left of the pixel structure, and the tilt direction of the branch electrode in the domain is also inclined toward the lower left direction. Taking the A4 domain as an example, the relative position of the A4 domain is located at the lower right of the pixel structure, and the tilt direction of the branch electrode in the domain is also inclined toward the lower right direction. That is to say, the orientation of any one of the branch electrodes in the A1 domain is different from that of any one of the A2 domains, that is, the branch electrodes in the A1 domain are not parallel to the branch electrodes in the A2 domain. Similarly, the branch electrodes in the A1 domain are not parallel to the branch electrodes in the A3 domain.

The orientation of the above electrodes can be set to improve the display color shift after voltage application.

The invention is designed by arranging branch electrodes in different domain in a single pixel structure to be composed of a plurality of sub-branch electrodes connected in series, at the same time, the acute intersecting angle between the sub-branch electrode and the main electrode is greater than or equal to the first angle and less than or equal to the second angle, thereby changing the orientation direction of the liquid crystal in the partial domain, the whitening phenomenon of the liquid crystal panel of the PSVA type when viewed from different viewing angles is solved, and the high transmittance can be maintained, so that the display is uniform and the display effect is improved.

The pixel structure of the invention designs the branch electrodes as non-linear ITO electrodes, and the acute intersecting angle between the sub-branch electrodes of each branch electrode and the main electrode is designed to be between 40 degrees and 45 degrees. Moreover, by designing the acute intersecting angle between the sub-branch electrode and the main electrode of each branch electrode in different proportions, the effect of improving the whitening of the viewing angle and the high transmittance can be achieved.

Embodiment 7

Figure 19:
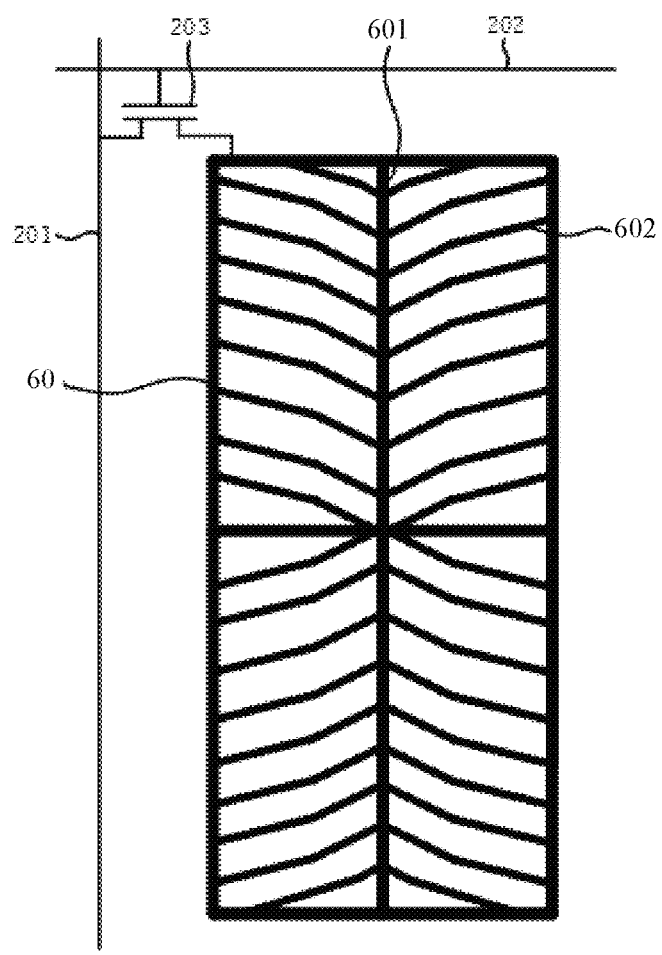
FIG. 19 is a schematic structural diagram of a pixel unit according to an embodiment of the invention.

Referring to FIG. 19, FIG. 19 is a schematic diagram of a pixel unit according to an embodiment of the invention. An embodiment of the invention further provides a pixel unit, where the pixel unit includes:

a data line 201, a scan line 202;

switching devices 203 electrically connected to the data line 201 and the scan line 202; and a pixel structure 60 electrically connected to the switch member 203.

The pixel structure 60 includes:

a main electrode 601;

a plurality of branch electrodes 602 connected to the main electrode 601;

wherein each of the branch electrodes includes N sub-branch electrodes connected in sequence, and each of the branch electrodes has a set number of sub-branch electrodes having the same acute intersecting angle as the main electrode, and the set number group is greater than or equal to 0 and less than N, and N>1.

In this embodiment, referring to FIG. 19, the data line 201 is vertically disposed with the scan line 202, it should be noted that, in this embodiment, a pixel structure 60 is carried by the data line 201 and the scan line 202 as an example. In an actual display panel, one scan line 202 and one data line 201 correspond to a plurality of pixel structures on which the load is connected. The data line 201 is configured to load the data driving signal onto the pixel structure 60, and the data driving signal controls the pixel structure to display colors of different gray scales according to the magnitude of the driving voltage; the scan line 202 is used to load a scan driving signal to the pixel structure, and the scan driving signal controls whether the data driving signal is loaded onto the pixel structure 60. In one embodiment, the data line 201 and the scan line 202 are generally made of a conductive material, and specifically may be a metal element, an alloy, a metal oxide, a metal nitride, a metal oxynitride or a combination of two or more of the above materials.

For the sake of better explanation, the present embodiment is exemplified by the switching device 203 being a TFT. Of course, the switching device 203 is not limited to the device as long as the function can be realized. Specifically, the TFT includes a source, a drain, and a gate, wherein the source is connected to the data line 201, the gate is connected to the scan line 202, and the drain is connected to the pixel structure 60. In operation, the scan driving circuit generates a scan driving signal, which is transmitted to the gate of the TFT through the scan line, thereby controlling the gate to be turned on. At this time, the data driving signal generated by the data driving circuit is transmitted to the source of the TFT through the scan line. At this time, since the TFT gate is turned on, the data driving signal of the source is input into the pixel structure 60 to complete one driving.

In a specific embodiment, one pixel unit includes an X row and Y column pixel structure (0<M≤X, 0<N≤Y), and adjacent two rows of pixel structures are mirror symmetrical, so that the purpose of the setting can further remove the whitish phenomenon, thereby improving the display effect.

For more convenient description, each pixel structure is marked with the sub pixels of the N-th row and the M-th column as $A_{N,M}$, for example, the pixel structure of the first row and the first column is $A_{1,1}$.

In a specific embodiment, the adjacent two columns of pixel structures have opposite polarities, that is, a polarity column inversion manner. For example, when the polarity of the pixel structure of the i-th column is +−+−+−, the polarity of the pixel structure corresponding to the (i+1)-th column is −+−+−+.

In a specific embodiment, in a frame, in a direction along the data line, a voltage is applied to the pixel structure alternately with a first driving voltage or a second driving voltage according to a first predetermined interval, a voltage is applied to the pixel structure alternately at a first driving voltage or a second driving voltage in a direction along the scan line at a second predetermined interval.

In a specific embodiment, along the data line direction, from the pixel structure $A_{1,N}$ to the pixel structure $A_{X,N}$, the first driving voltage or the second driving voltage is alternately loaded onto the corresponding pixel structure every first interval setting. At the same time, in the scan line direction, from the pixel structure $A_{M,1}$ to the pixel structure $A_{M,Y}$, the first driving voltage or the second driving voltage is alternately applied to the corresponding pixel structure every second interval setting.

In a specific embodiment, in a frame, along the data line direction, when the first interval setting is every other pixel structure, the scan line G1 is connected to the pixel structure $A_{1,N}$, and the voltage corresponding to the pixel structure $A_{1,N}$ is the first driving voltage, the scan line G2 is connected to the pixel structure $A_{2,N}$, and the voltage corresponding to the pixel structure $A_{2,N}$ is the second driving voltage, the scan line G3 is connected to the pixel structure $A_{3,N}$, and the voltage corresponding to the pixel structure $A_{3,N}$ is the first driving voltage, the scan line G4 is connected to the pixel structure $A_{4,N}$, and the voltage corresponding to the pixel structure $A_{4,N}$ is the second driving voltage, the scan line G5 is connected to the pixel structure $A_{5,N}$, and the voltage corresponding to the pixel structure $A_{5,N}$ is the first driving voltage, the scan line G6 is connected to the pixel structure $A_{6,N}$, and the voltage corresponding to the pixel structure $A_{6,N}$ is the second driving voltage, and so on. In the direction of the data line, every other pixel structure alternates with the first driving voltage or the second driving voltage corresponding to the loading voltage to the pixel structure; meanwhile, along the scan line direction, when the second interval setting is every other pixel structure, the data line D1 is connected to the pixel structure $A_{M,1}$, and the voltage corresponding to the pixel structure $A_{M,1}$ is the first driving voltage, the data line D2 is connected to the pixel structure $A_{M,2}$, and the voltage corresponding to the pixel structure $A_{M,2}$ is the second driving voltage, the data line D3 is connected to the pixel structure $A_{M,3}$, and the voltage corresponding to the pixel structure $A_{M,3}$ is the first driving voltage, the data line D4 is connected to the pixel structure $A_{M,4}$, and the voltage corresponding to the pixel structure $A_{M,4}$ is the second driving voltage, the data line D5 is connected to the pixel structure $A_{M,5}$, and the voltage corresponding to the pixel structure $A_{M,5}$ is the first driving voltage, the data line D6 is connected to the pixel structure $A_{M,6}$, and the voltage corresponding to the pixel structure $A_{M,6}$ is the second driving voltage. Similarly, in the direction of the scan line, every other pixel structure alternates with the first driving voltage or the second driving voltage corresponding to the loading voltage to the pixel structure.

In this embodiment, the first predetermined interval and the second interval setting are set according to actual needs, which is not specifically limited in this embodiment.

Figure 20:
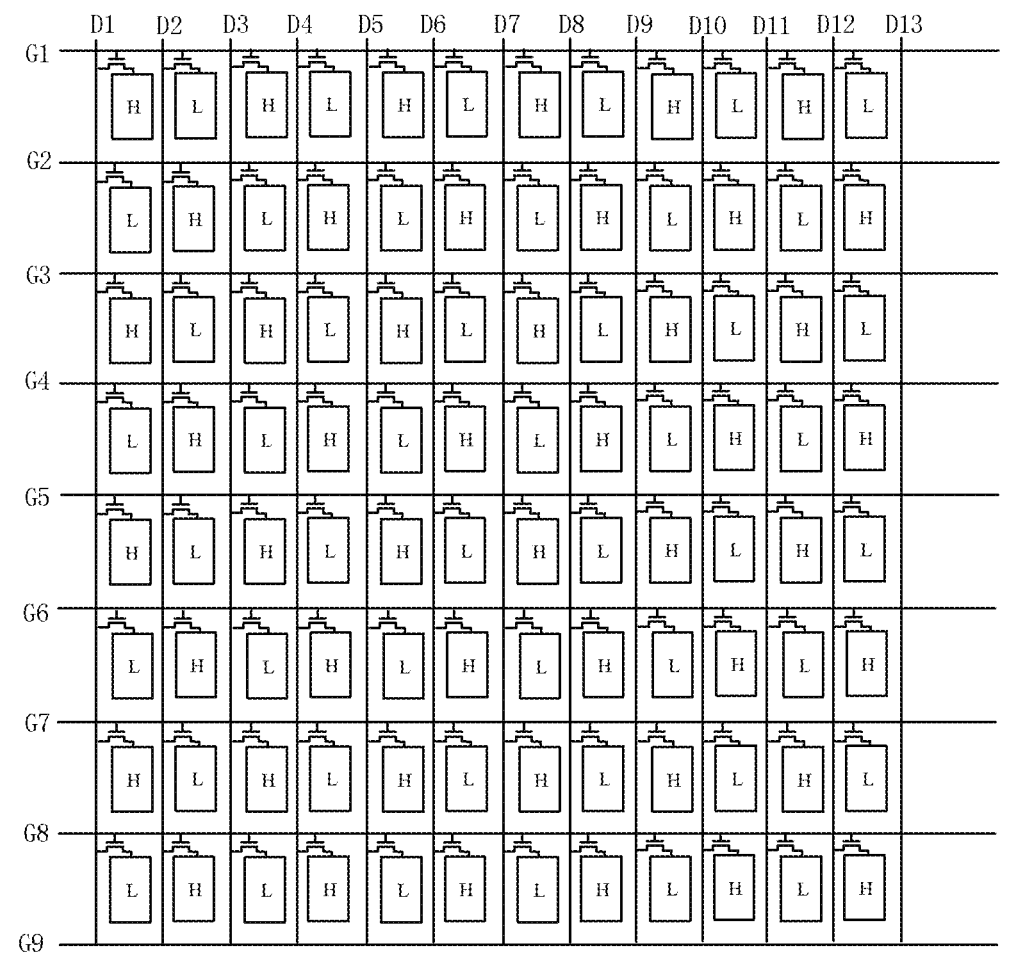

For example, referring to FIG. 20, taking 8×12 as an example, the pixel structure includes 8 rows and 12 columns, and the first interval setting and the second interval setting are every other pixel structure.

In one frame, along the direction of the data line D1, the scan line G1 is connected to the pixel structure $A_{1,1}$, and the voltage corresponding to the pixel structure $A_{1,1}$ is the first driving voltage, the scan line G2 is connected to the pixel structure $A_{2,1}$, and the voltage corresponding to the pixel structure $A_{2,1}$ is the second driving voltage, the scan line G3 is connected to the pixel structure A3,1, and the voltage corresponding to the pixel structure A3,1 is the first driving voltage, the scan line G4 is connected to the pixel structure A4,1, and the voltage corresponding to the pixel structure A4,1 is the second driving voltage, and so on, respectively, along the data lines D2 to D12. Every other pixel structure, alternating with the first driving voltage or the second driving voltage corresponding to the loading voltage to the pixel structure; meanwhile, along the direction of the scan line G1, the data line D1 is connected to the pixel structure $A_{1,1}$, and the voltage corresponding to the pixel structure $A_{M,1}$ is the first driving voltage, the data line D2 is connected to the pixel structure $A_{1,2}$, and the voltage corresponding to the pixel structure $A_{1,2}$ is the second driving voltage, the data line D3 is connected to the pixel structure $A_{1,3}$, and the voltage corresponding to the pixel structure $A_{1,3}$ is the first driving voltage, the data line D4 is connected to the pixel structure $A_{1,4}$, and the voltage corresponding to the pixel structure $A_{1,4}$ is the second driving voltage, and so on, respectively, in the direction of the scan lines G2 to G8, every other pixel structure, the first driving voltage or the second driving voltage is alternately applied to the pixel structure.

In this embodiment, the first gray scale data and the second gray scale data are formed according to the original pixel data, and the pixel gray scales of the first gray scale data and the second gray scale data are different, generating a first driving voltage according to the first gray scale data, and generating a second driving voltage according to the second gray scale data; and in a frame, the first driving voltage or the second driving voltage is loaded to the pixel structure along the data line direction, in this way, it is possible to prevent the voltage applied to the pixel structure from being affected by the polarity inversion, thereby avoiding the occurrence of crosstalk and bright and dark lines.

In a specific example, the first gray scale data is considered to be high gray scale data, and the second gray scale data is considered to be low gray scale data, correspondingly, the magnitude of the voltage input to the pixel structure is determined by the gray scale, and the high gray scale voltage corresponding to the high gray scale data is generated, that is, the first driving voltage; a low gray scale voltage corresponding to the low gray scale data, that is, a second driving voltage, it is worth mentioning that the above-mentioned high gray scale and low gray scale represent the relative values of the gray scale sizes of the two groups, and the magnitude of the values is not individually limited.

Based on the pixel structure obtained in the sixth embodiment, inserting a voltage to the pixel structure alternately with a first driving voltage or a second driving voltage in a direction of the data line along a first predetermined interval in a frame, transmitting a voltage to the pixel structure with a first driving voltage or a second driving voltage alternately along the scan line direction according to a second predetermined interval, at the same time, the pixel unit utilizes the polarity column inversion method, so that the whitening phenomenon can be further improved, and at the same time, the high transmittance can be maintained, the display is uniform, and the display effect is improved.

Furthermore, an embodiment of the invention further provides a display panel (please refer to FIG. 8 again), including:

a first substrate 11;

a second substrate 12 located opposite to the first substrate 11;

a pixel unit 14 disposed between the first substrate and the second substrate, and the structure thereof is referred to the related description of the pixel unit of the seventh embodiment; and a liquid crystal material 13 located between the first substrate and the second substrate.

The material of the first substrate and the second substrate may be a semiconductor material such as glass or quartz, or may be an organic polymer or the like, and the material of the first substrate may be the same as or different from the material of the second substrate. The liquid crystal material 13 is mainly composed of liquid crystal molecules, and the liquid crystal molecules are correspondingly disposed between adjacent two branch electrodes in each pixel unit, so that after the voltage is applied, the liquid crystal molecules reach a better alignment, thereby improving the light transmittance, thereby improving the display effect.

The pixel unit and the display panel of the embodiment of the invention can achieve the dual purpose of improving the whitening phenomenon of the viewing angle without changing the process conditions, and can also maintain a high transmittance.

Referring to FIG. 9 again, in the embodiment, the abscissa corresponds to a gray scale, and the ordinate corresponds to a luminance normalized value. 45 degrees, Azimuth0 represents the display panel with an angle of 45 degrees between the branch electrode and the main electrode in the existing design, and the viewing angle is positive. 45 degrees, Azimuth60 represents the display panel with an angle of 45 degrees between the branch electrode and the main electrode in the existing design, and the viewing angle is 60 degrees from the angle of the display panel. 42+45 degrees, Azimuth0 is a display panel provided by an embodiment of the invention, represents a display panel in which the angle between the partial sub-branch electrode and the main electrode is 45 degrees, and the angle between the partial sub-branch electrode and the main electrode is 42 degrees, and the viewing angle is positive. 42+45 degrees, Azimuth 60 is a display panel provided by an embodiment of the invention, and the viewing angle of the observation angle is 60 degrees with the display panel. When viewed at a viewing angle of 60 degrees, the transmittance at 128 gray scale is 4.4% lower than that of a conventional design in which the angle between the ITO electrode and the horizontal direction of the current display panel is 45 degrees. Its gamma curve is closer to the curve of the gamma 2.2; in the front view direction, the transmittance of the pixel structure of the display panel proposed by the embodiment of the invention is only 0.38% lower than the transmittance of the pixel structure of the currently designed display panel, and the decrease is small. Therefore, it is possible to effectively improve the whitening phenomenon of the viewing angle while maintaining a high transmittance.

Moreover, it will be understood that the foregoing various embodiments are merely illustrative of the invention. The technical solutions of the various embodiments may be used in any combination and in combination in the case that the technical features are not conflicting, the structure is not contradictory, and the object of the invention is not violated.

It should be noted that in the several embodiments provided by the invention, it should be understood that the disclosed system, apparatus, and method may be implemented in other manners. For example, the device embodiments described above are merely illustrative. For example, the division of the unit is only a logical function division, and the actual implementation may have another division manner. For example, multiple units or components may be combined or integrated into another system, or some features may be omitted or not performed. In addition, the mutual coupling or direct coupling or communication connection shown or discussed may be an indirect coupling or communication connection through some interface, device or unit, and may be in an electrical, mechanical or other form.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment.

The above is a further detailed description of the invention in connection with the specific preferred embodiments, and the specific embodiments of the invention are not limited to the description. It will be apparent to those skilled in the art that the invention may be made without departing from the spirit and scope of the invention.

What is claimed is:

1. A pixel unit, comprising: a plurality of pixel structures, wherein the plurality of pixel structures comprises:
   a first pixel structure essentially comprising one cross-shaped first main electrode and first branch electrodes connected to the first main electrode to form four first domains, wherein an acute intersecting angle between the first branch electrode and the first main electrode is a first angle; and
   a second pixel structure essentially comprising one cross-shaped second main electrode and second branch electrodes connected to the second main electrode to form four second domains, wherein an acute intersecting angle between the second branch electrode and the second main electrode is a second angle;
   wherein the pixel unit further comprises:
      data lines comprising a first data line and a second data line different from the first data line;

a scan line;
switching devices comprising a first switching device and a second switching device, wherein the first switching device is electrically connected to the first data line and the scan line and further is electrically connected to the first pixel structure, the second switching device is electrically connected to the second data line and the scan line and further is electrically connected to and the second pixel structure, and thereby the first pixel structure and the second pixel structure are electrically connected to the same scan line but electrically connected to different data lines respectively being the first data line and the second data line; the first pixel structure and the second pixel structure are juxtaposed to each other in a lengthwise direction of the scan line; and the first pixel structure and the second pixel structure are independently driven by the first data line and the second data line;
wherein the second angle is greater than the first angle, so that the first pixel structure and the second pixel structure juxtaposed to each other in the lengthwise direction of the scan line and electrically connected to the same scan line but electrically connected to the different data lines have different acute intersecting angles respectively being the first angle and the second angle.

2. The pixel unit according to claim 1, wherein the first angle is greater than or equal to 40 degrees and less than 45 degrees, and the second angle is equal to 45 degrees.

3. The pixel unit according to claim 1, wherein adjacent two of the first branch electrodes in any one of the four first domains are parallel to each other, and first branch electrodes of adjacent two of the four first domains are not parallel to each other.

4. The pixel unit according to claim 3, wherein adjacent two of the second branch electrodes in any one of the four second domains are parallel to each other, and second branch electrodes of adjacent two of the four second domains are not parallel to each other.

5. The pixel unit according to claim 1, wherein the first pixel structure and the second pixel structure are alternately arranged along a lengthwise direction of the data line according to a first interval setting; the first pixel structure and the second pixel structure are alternately arranged along a lengthwise direction of the scan line according to a second interval setting.

6. The pixel unit according to claim 5, wherein a polarity of the pixel structure in an i-th column is opposite to a polarity of the pixel structure in an (i+1)-th column, and a voltage is applied to the pixel structures in a first driving method or a second driving method.

7. The pixel unit according to claim 6, wherein the first driving method comprises a first sub driving method and a second sub driving method; and in a frame, the voltage is loaded onto the pixel structure in the first sub driving method or the second sub driving method alternately in a first predetermined interval along the lengthwise direction of the scan line;
the second driving method comprises a third sub driving method and a fourth sub driving method; and in a frame, the voltage is loaded onto the pixel structure in the third sub driving method or the fourth sub driving method alternately in a second predetermined interval along the lengthwise direction of the scan line.

8. A pixel unit comprising: a plurality of pixel structures, wherein the plurality of pixel structures comprises:
a first pixel structure consisting of one cross-shaped first main electrode and first branch electrodes connected to the first main electrode to form four first domains, wherein an acute intersecting angle between the first branch electrode and the first main electrode is a first angle; and
four second pixel structures, wherein each of the four second pixel structures is consisted of one cross-shaped second main electrode and second branch electrodes connected to the second main electrode to form four second domains, and an acute intersecting angle between the second branch electrode and the second main electrode is a second angle;
wherein the four second pixel structures are immediately adjacent to the first pixel structure and respectively located at up, down, left and right of the first pixel structure to form one three-pixel-structure column and one three-pixel-structure row, the one three-pixel-structure column comprises two of the four second pixel structures and the first pixel structure, the one three-pixel-structure row comprises the other two of the four second pixel structures and the first pixel structure;
wherein the two second pixel structures and the first pixel structure of the three-pixel-structure column are spaced from one another and connected to different scan lines respectively, the two second pixel structures and the first pixel structure of the three-pixel-structure row are spaced from one another and connected to different data lines respectively;
wherein the second angle of each of the four second pixel structures is different from the first angle of the first pixel structure.

9. The pixel unit according to claim 8, wherein the first angle is greater than or equal to 40 degrees and less than 45 degrees, and the second angle is equal to 45 degrees.

10. The pixel unit according to claim 8, wherein adjacent two of the first branch electrodes in any one of the four first domains are parallel to each other, and first branch electrodes of adjacent two of the four first domains are not parallel to each other.

11. The pixel unit according to claim 8, wherein adjacent two of the second branch electrodes in any one of the four second domains are parallel to each other, and second branch electrodes of adjacent two of the four second domains are not parallel to each other.

* * * * *